(12) United States Patent
Beer et al.

(10) Patent No.: US 9,809,397 B2
(45) Date of Patent: Nov. 7, 2017

(54) METHOD AND APPARATUS FOR TRANSFERRING ARTICLE LAYERS BETWEEN ADJACENT MODULES

(71) Applicant: Krones Aktiengesellschaft, Neutraubling (DE)

(72) Inventors: Erhard Beer, Ebbs (AT); Martin Osterhammer, Frasdorf (DE)

(73) Assignee: Krones Aktiengesellschaft, Neutraubling (DE)

( * ) Notice: Subject to any disclaimer, the term of this patent is extended or adjusted under 35 U.S.C. 154(b) by 53 days.

(21) Appl. No.: 13/787,071

(22) Filed: Mar. 6, 2013

(65) Prior Publication Data
US 2013/0243558 A1    Sep. 19, 2013

(30) Foreign Application Priority Data

Mar. 14, 2012  (DE) .......................... 10 2012 204 013

(51) Int. Cl.
*B65G 57/09*  (2006.01)
*B65G 47/76*  (2006.01)
*B65G 47/84*  (2006.01)
*B65G 57/10*  (2006.01)
*B65G 59/02*  (2006.01)

(52) U.S. Cl.
CPC ......... *B65G 47/766* (2013.01); *B65G 47/841* (2013.01); *B65G 57/10* (2013.01); *B65G 59/02* (2013.01)

(58) Field of Classification Search
CPC .... B65G 47/76; B65G 47/763; B65G 47/766; B65G 57/10; B65G 59/02; B65G 29/00; B65G 47/841; B65G 17/12; B65G 17/002; B65B 35/405
USPC ............ 414/794, 798.7, 790.7, 791.7, 791.8, 414/794.6; 198/469.1, 725, 728
See application file for complete search history.

(56) References Cited

U.S. PATENT DOCUMENTS 3,363,394 A  *  1/1968  Rainbow ................. B65B 5/106
                                                                  53/496
4,055,257 A     10/1977  Krebs
(Continued)

FOREIGN PATENT DOCUMENTS

CN           1278505        1/2001
DE        41 17 434        12/1992
(Continued)

*Primary Examiner* — Anna M Momper
*Assistant Examiner* — Lynn E Schwenning
(74) *Attorney, Agent, or Firm* — Davidson, Davidson & Kappel, LLC

(57) ABSTRACT

A method and apparatus for horizontally shifting an article group or article layer, composed of a plurality of articles, from a first position and/or from a conveying movement into a second rest position while largely maintaining the relative positions of the articles in the article layer or group to each other, said transfer being effected by at least one first pusher bar engaging with the articles located at the back of the article group or article layer, as considered in relation to the conveying or feed direction. A support bar, which is at least temporarily allocated to the articles located at the front of the article group or layer, as considered in relation to the conveying direction, moves ahead at a slight distance from or abuts on the foremost articles of the article group or layer at least immediately before or on reaching the rest position.

15 Claims, 28 Drawing Sheets

(56) References Cited

U.S. PATENT DOCUMENTS

| | | | | |
|---|---|---|---|---|
| 4,934,509 A | * | 6/1990 | Gilgien | 198/460.1 |
| 4,978,275 A | * | 12/1990 | Reid | B65G 57/11 |
| | | | | 198/419.1 |
| 5,271,709 A | * | 12/1993 | VanderMeer | B65G 47/088 |
| | | | | 198/419.1 |
| 5,310,307 A | * | 5/1994 | VanderMeer | B65G 47/5181 |
| | | | | 414/796.2 |
| 5,393,196 A | | 2/1995 | Bluemle | |
| 5,657,615 A | * | 8/1997 | Muller | 53/448 |
| 5,699,651 A | * | 12/1997 | Miller et al. | 53/448 |
| 5,758,471 A | * | 6/1998 | Denley | B65B 35/50 |
| | | | | 53/399 |
| 5,893,701 A | * | 4/1999 | Pruett | B65B 23/14 |
| | | | | 198/419.1 |
| 6,439,376 B1 | | 8/2002 | Spatafora et al. | |
| 6,698,576 B2 | * | 3/2004 | Hahnel | B65G 17/26 |
| | | | | 198/469.1 |
| 6,843,360 B2 | | 1/2005 | Peterman et al. | |
| 6,953,113 B2 | | 10/2005 | Iwasa et al. | |
| 7,543,424 B2 | | 6/2009 | Lechner et al. | |
| 8,056,704 B2 | | 11/2011 | Christ | |
| 2001/0042673 A1 | * | 11/2001 | Nakanishi | B65G 47/29 |
| | | | | 198/419.3 |
| 2003/0007858 A1 | * | 1/2003 | Pluss | B65H 31/3081 |
| | | | | 414/790.3 |
| 2005/0121289 A1 | * | 6/2005 | Peterman et al. | 198/429 |
| 2008/0047231 A1 | * | 2/2008 | Wagner et al. | 53/443 |
| 2009/0252579 A1 | * | 10/2009 | Dupper et al. | 414/222.01 |
| 2010/0089721 A1 | * | 4/2010 | Aronsson et al. | 198/418.7 |
| 2010/0205913 A1 | * | 8/2010 | Iwasa et al. | 53/531 |
| 2010/0257818 A1 | * | 10/2010 | Ripkens et al. | 53/410 |
| 2011/0005898 A1 | * | 1/2011 | Pundsack et al. | 198/429 |

FOREIGN PATENT DOCUMENTS

| | | |
|---|---|---|
| DE | 4207725 | 9/1993 |
| DE | 44 35 981 | 4/1996 |
| DE | 100 48 007 | 4/2002 |
| DE | 10 2005 026 639 | 12/2006 |
| DE | 60307332 | 4/2007 |
| EP | 1 382 532 | 1/2004 |
| FR | 2259750 | 8/1975 |
| GB | 1150300 | 4/1969 |
| WO | WO 2010100545 | 9/2010 |

* cited by examiner

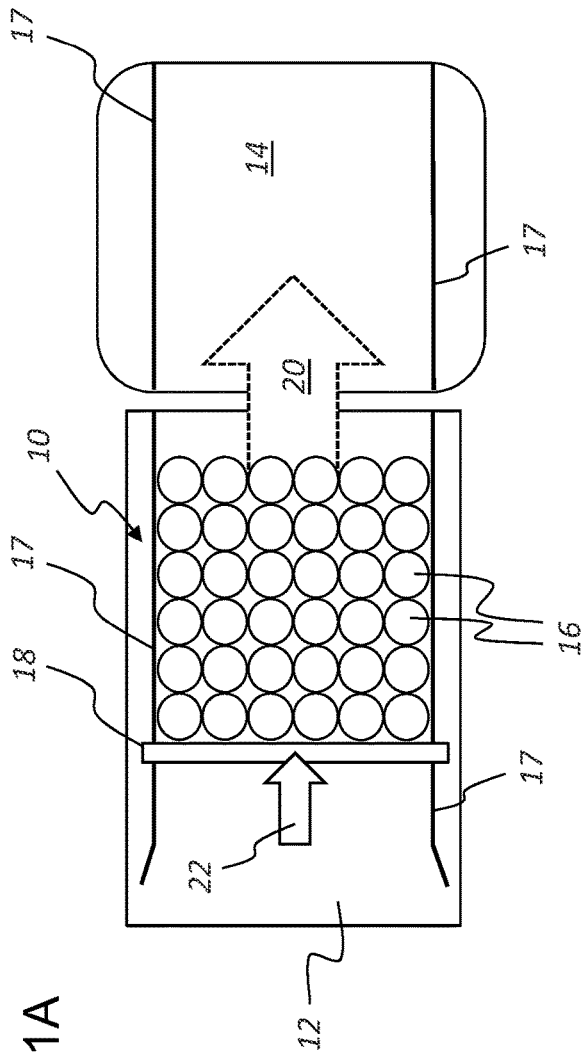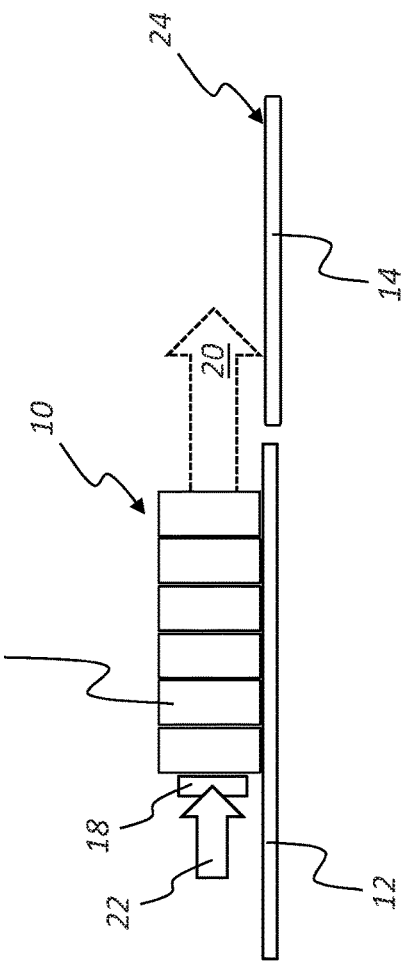
Fig. 1A
Prior Art
Fig. 1B
Prior Art

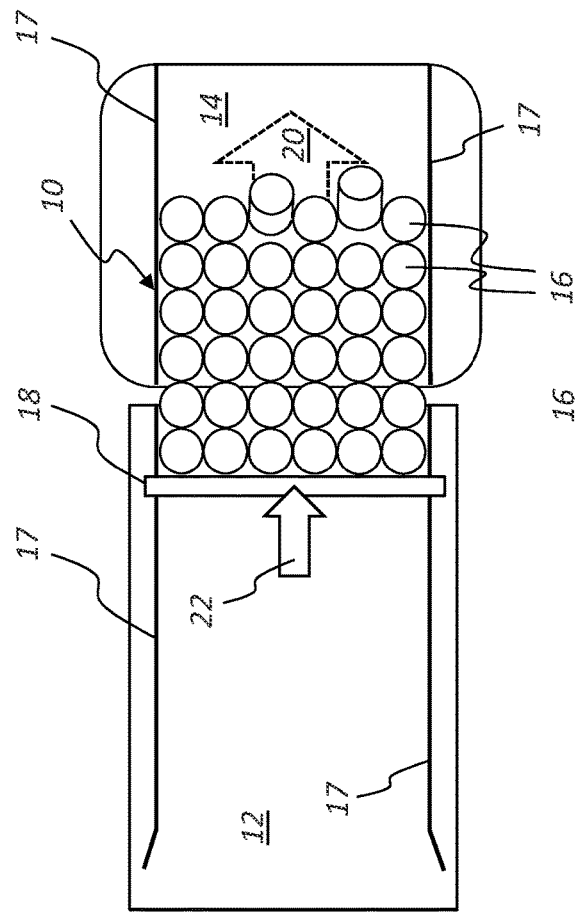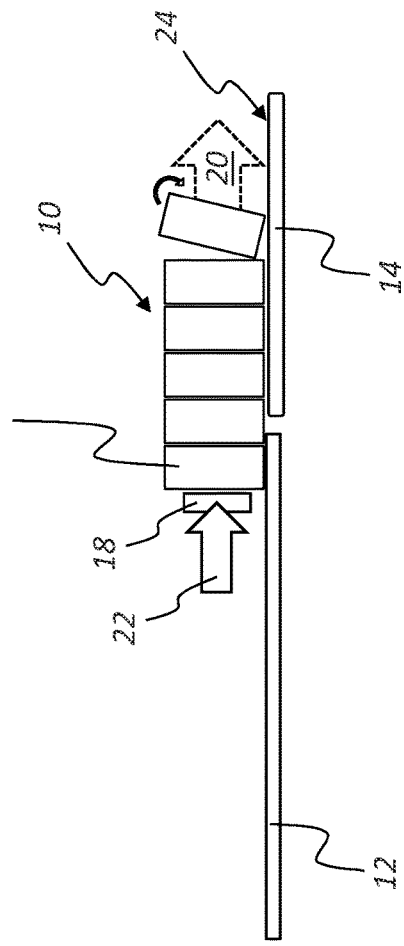
Fig. 2A
Prior Art
Fig. 2B
Prior Art

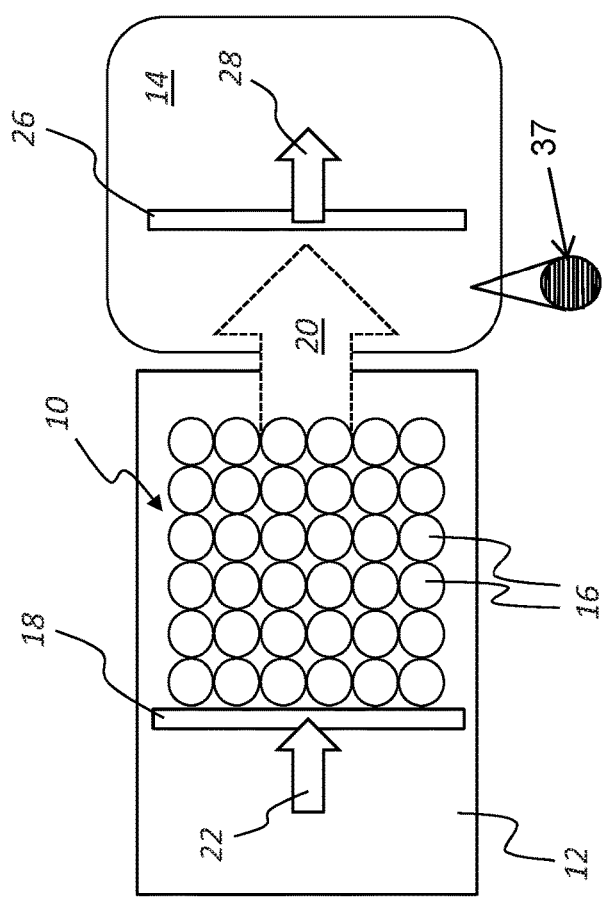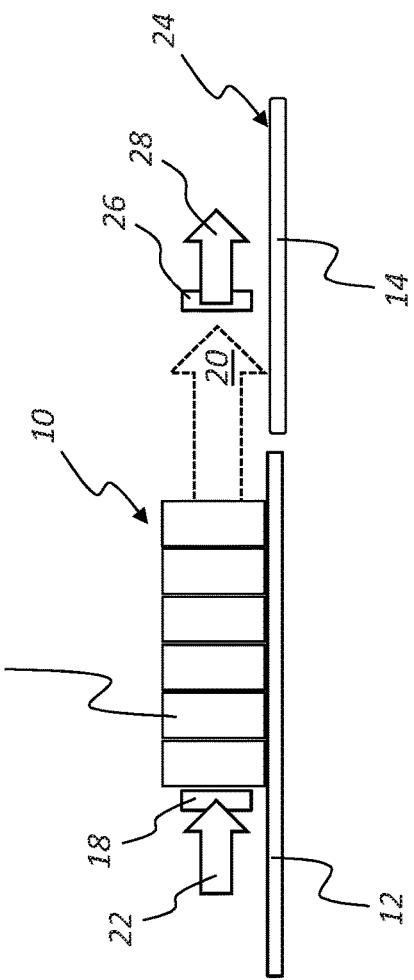
Fig. 3A
Fig. 3B

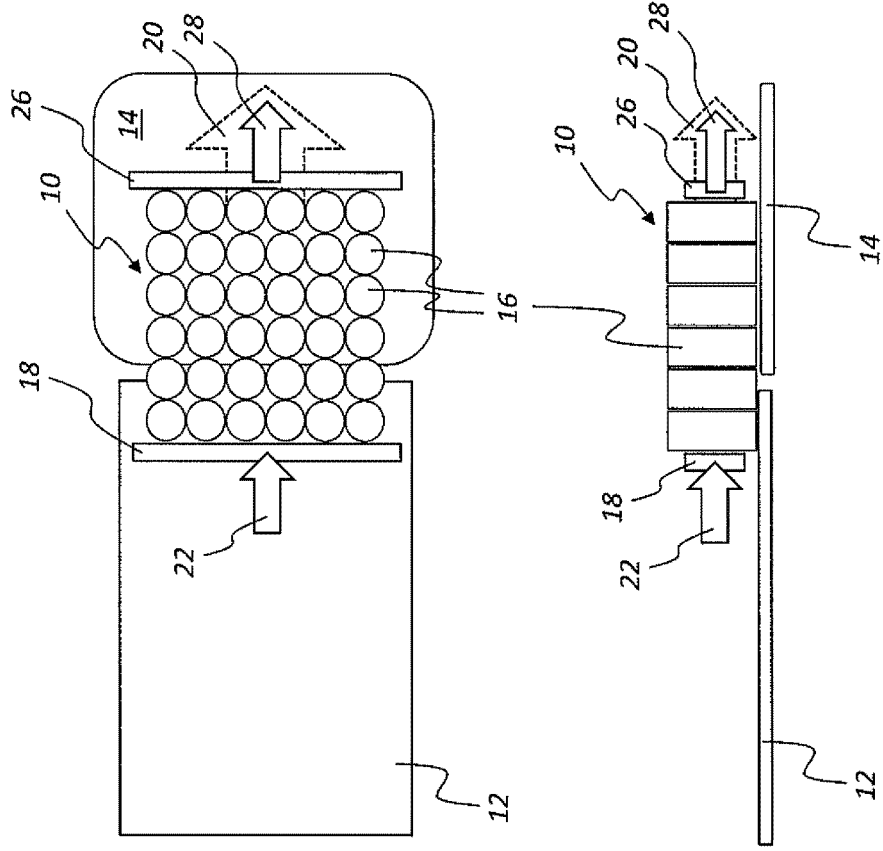

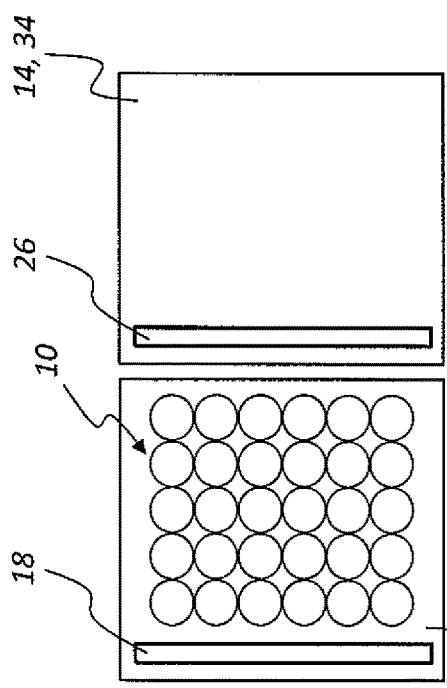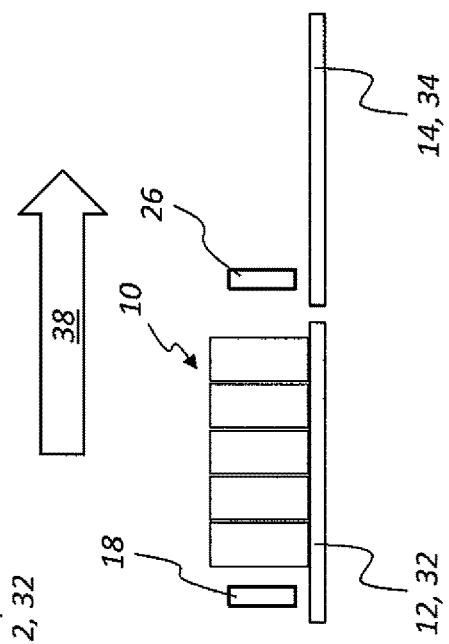
Fig. 5A
Fig. 5B

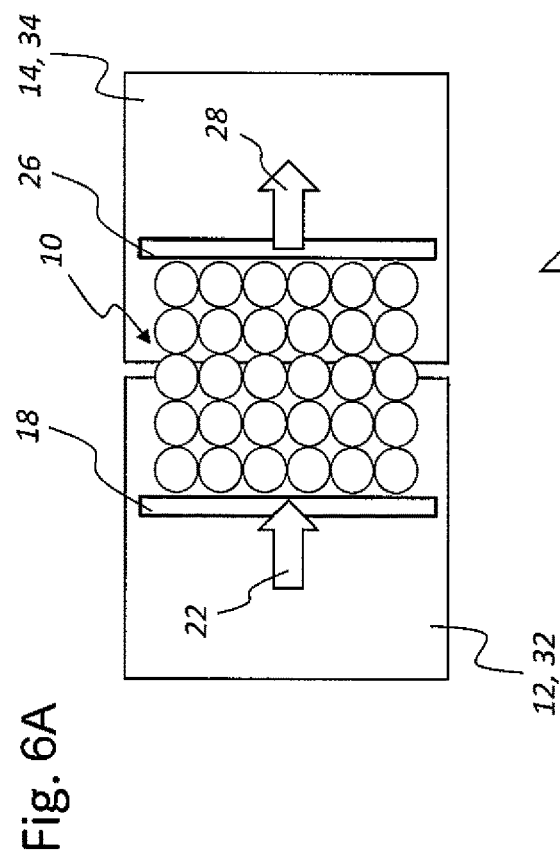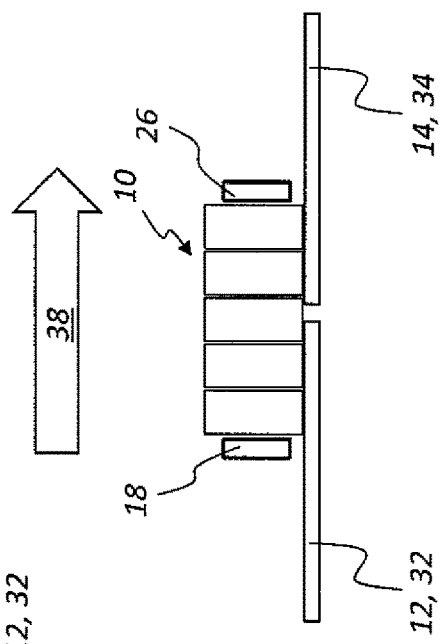
Fig. 6A
Fig. 6B

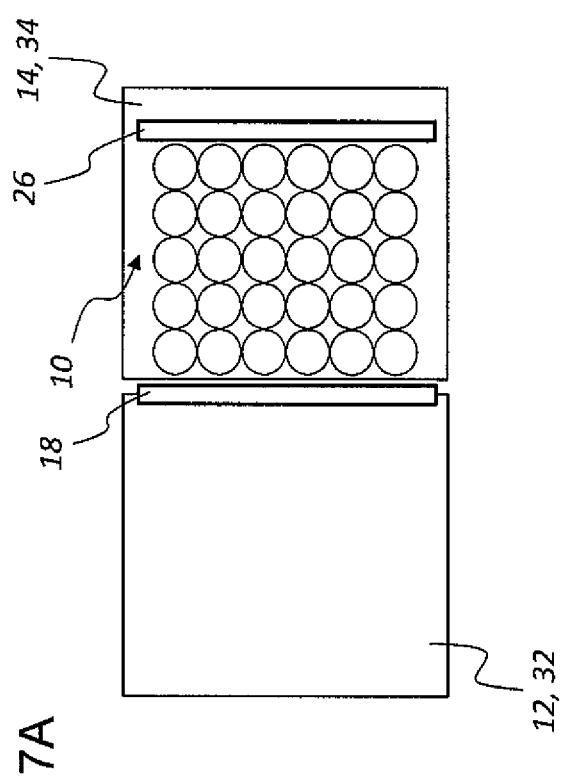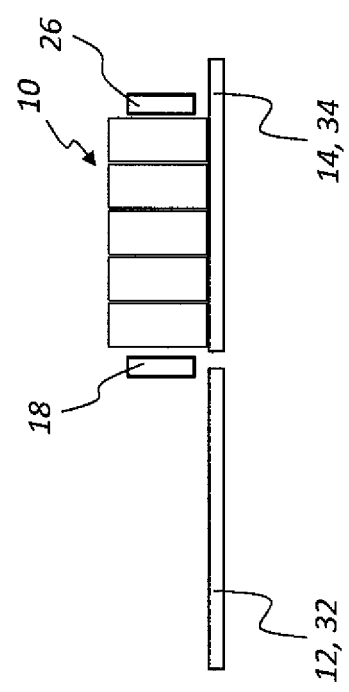
Fig. 7A
Fig. 7B

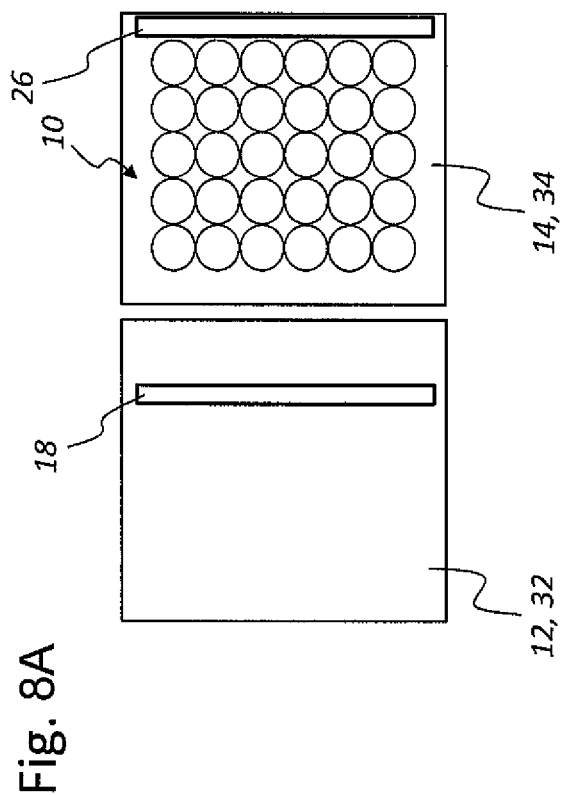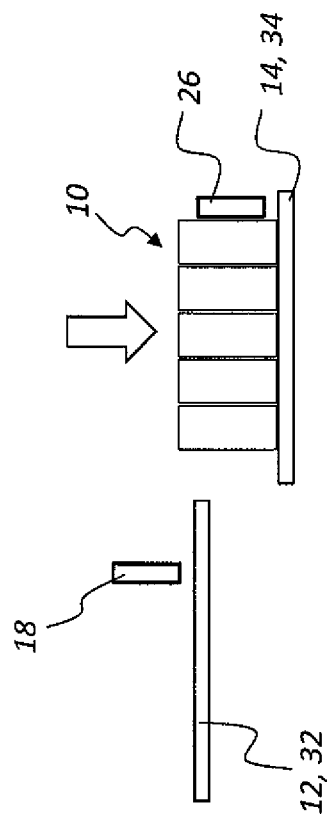
Fig. 8A
Fig. 8B

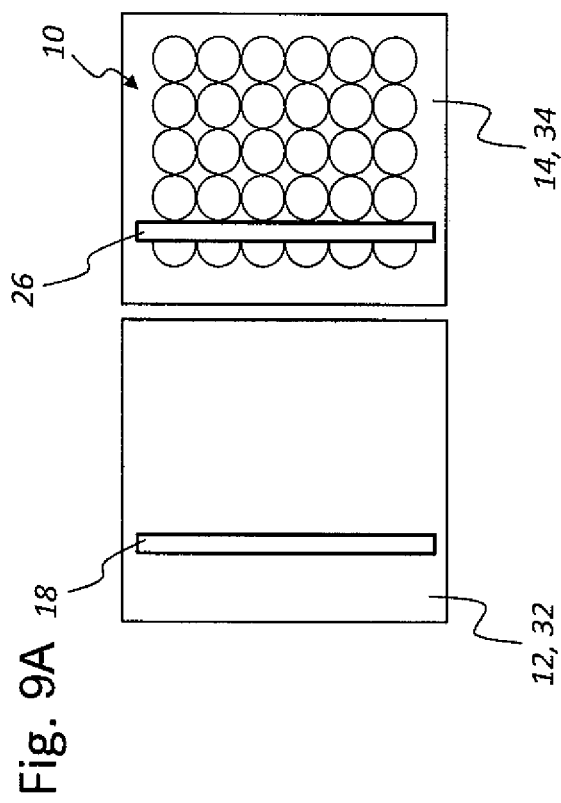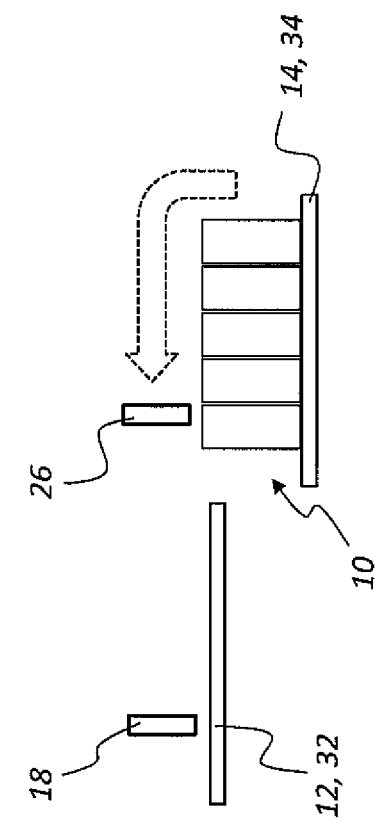

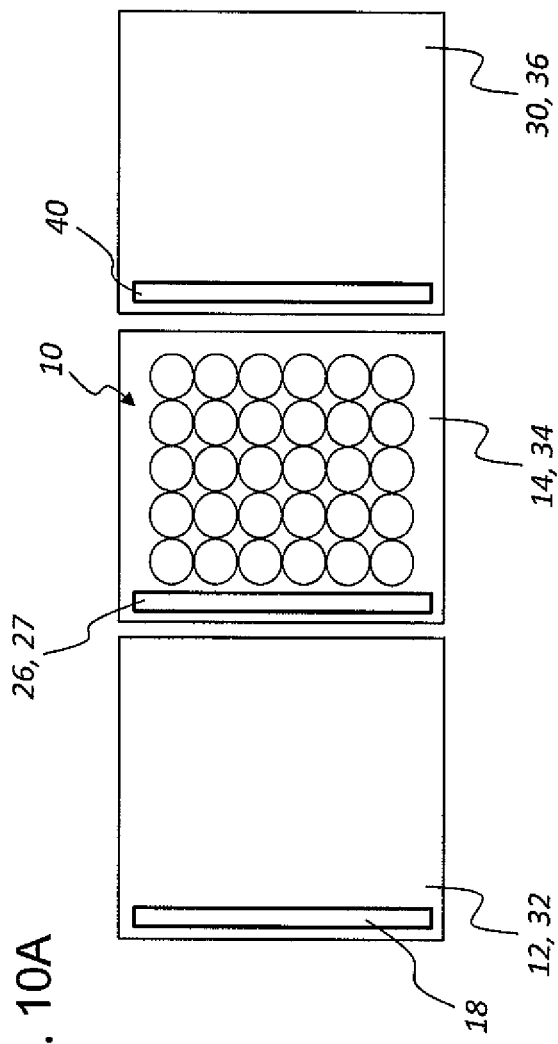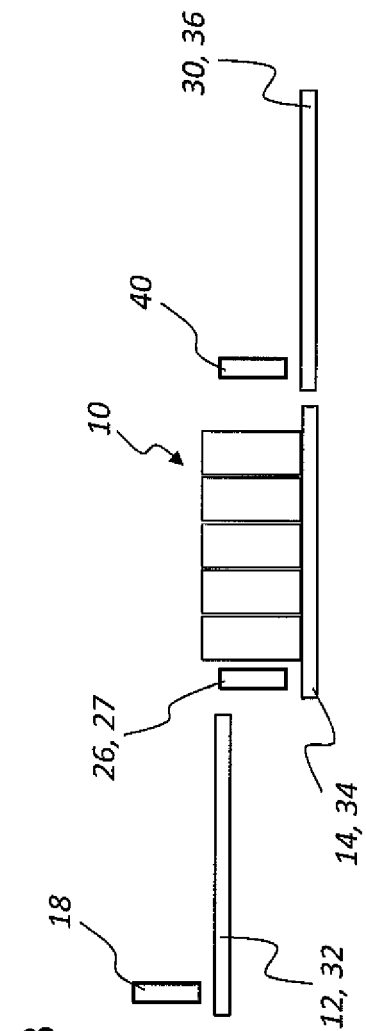

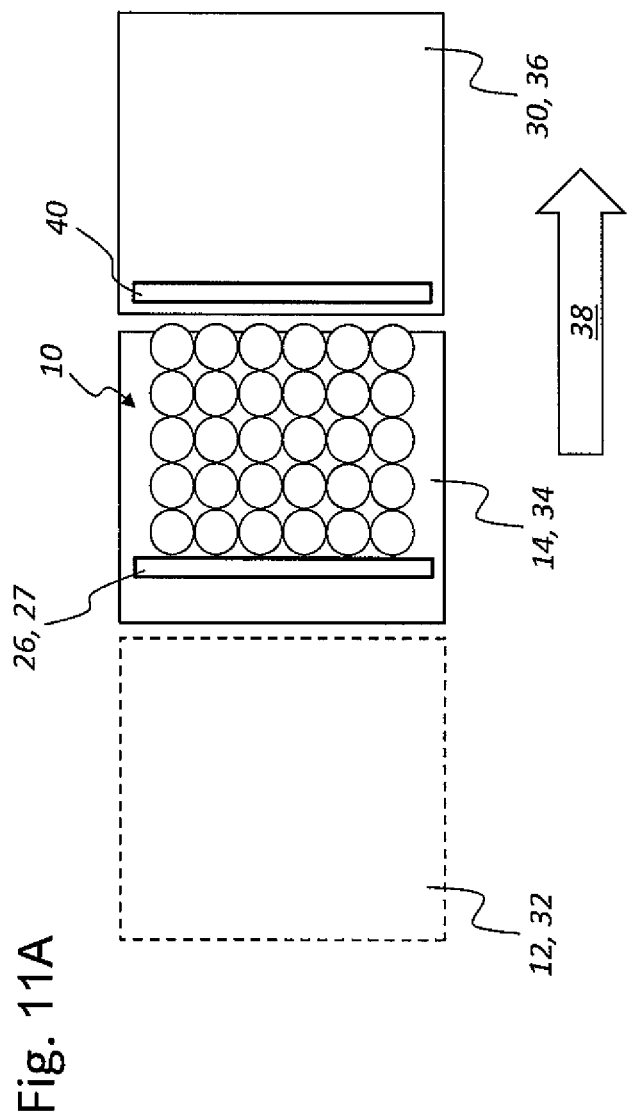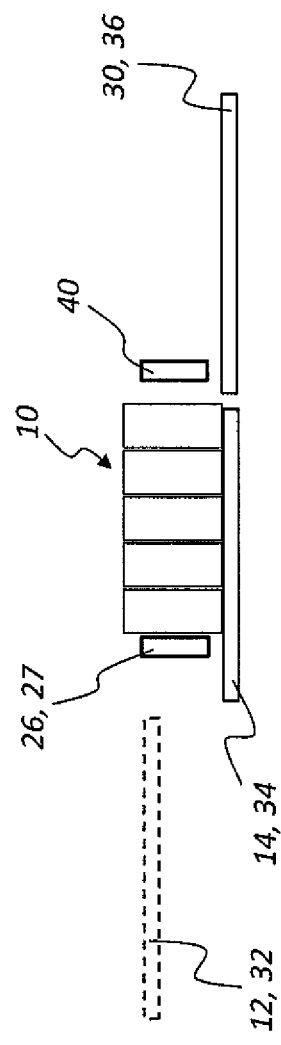

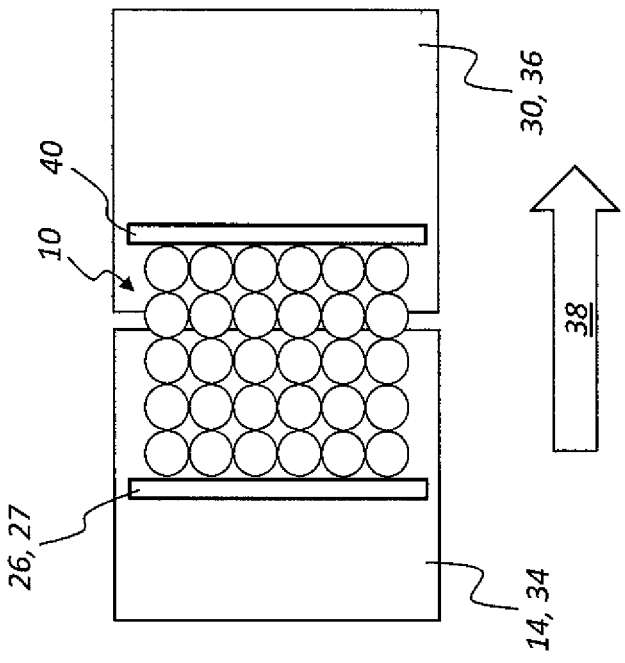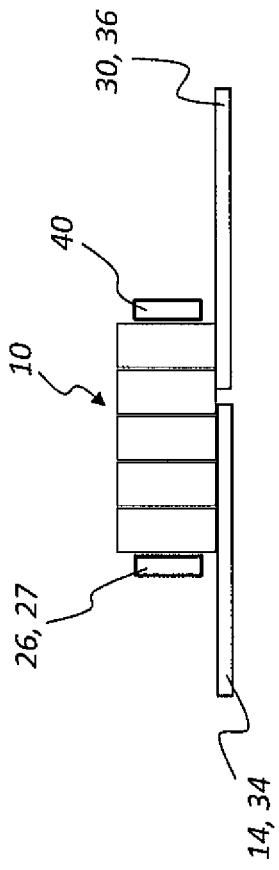

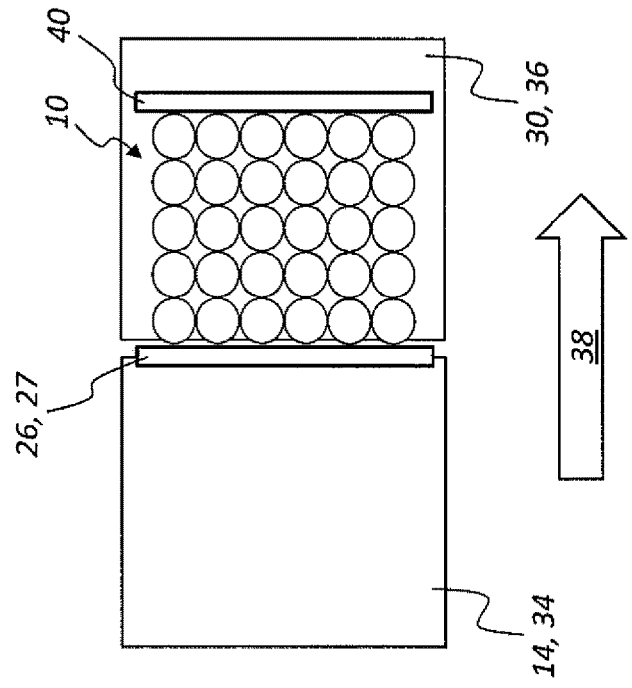
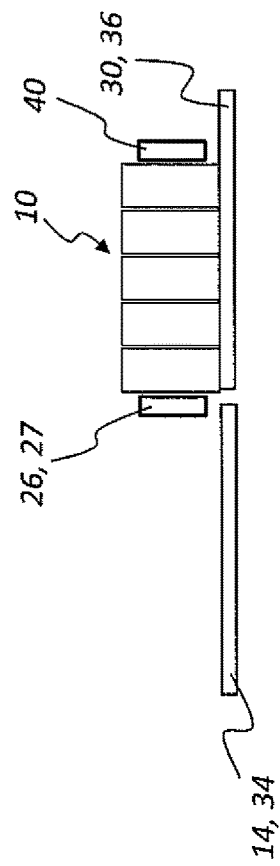
Fig. 13A
Fig. 13B

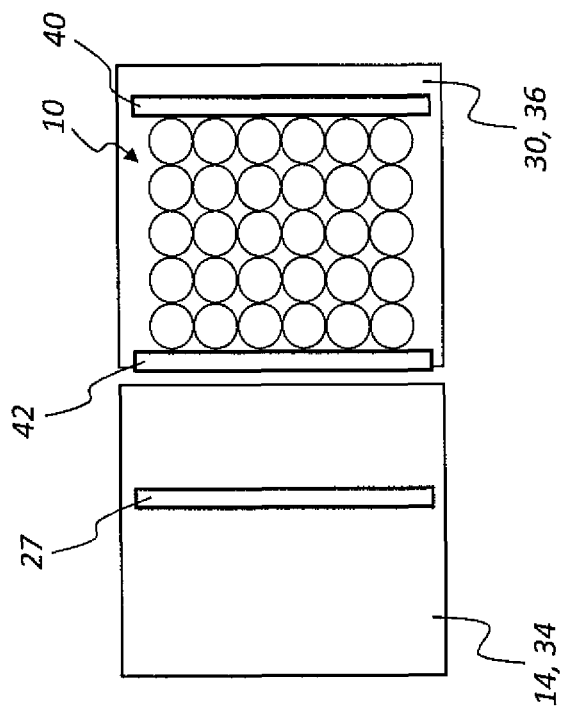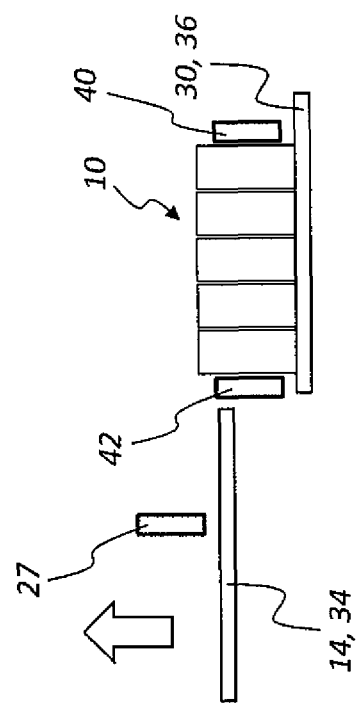
Fig. 14A
Fig. 14B

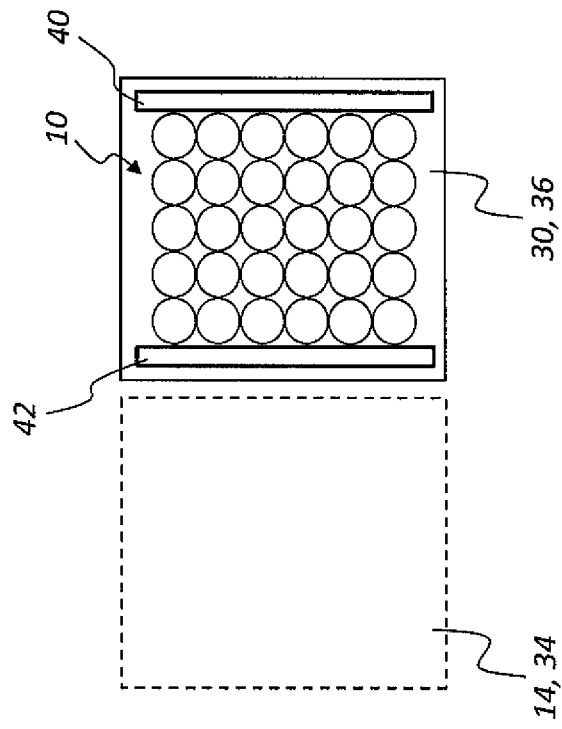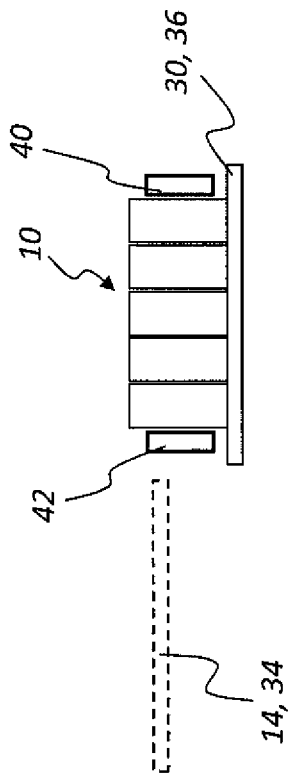
Fig. 15A
Fig. 15B

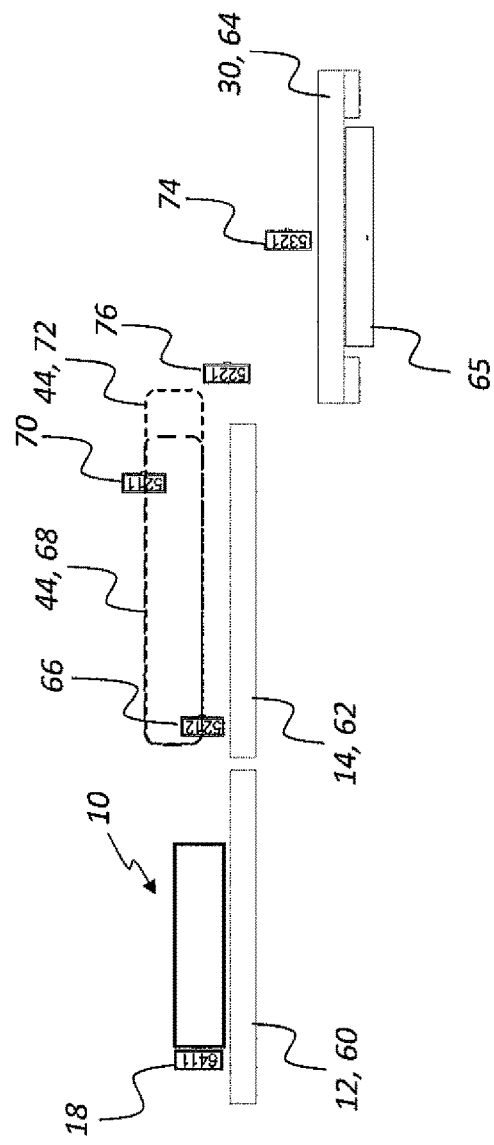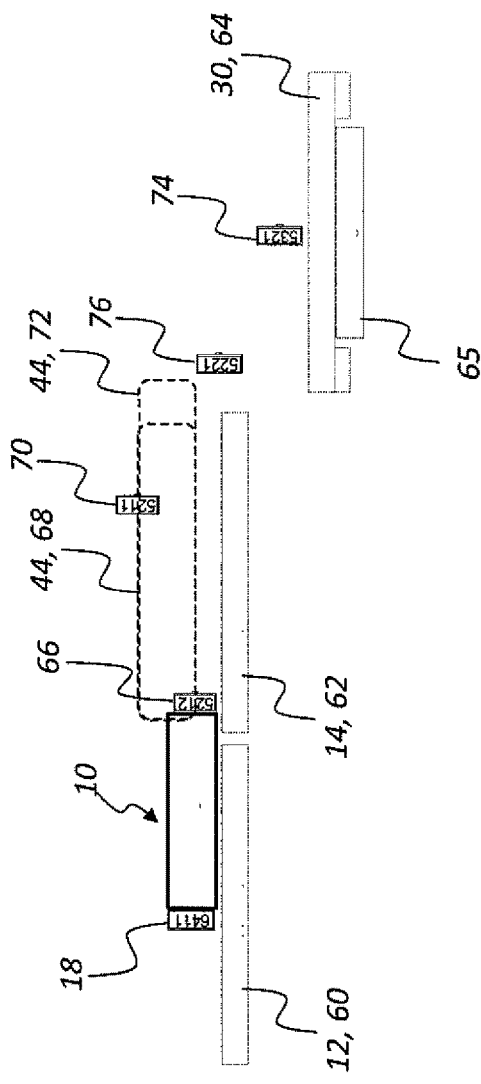
Fig. 18A
Fig. 18B

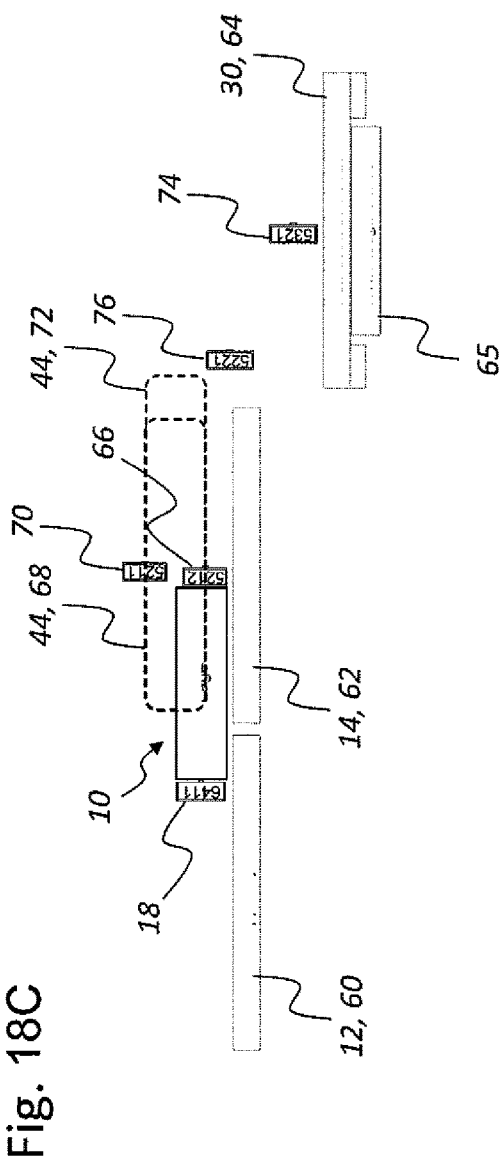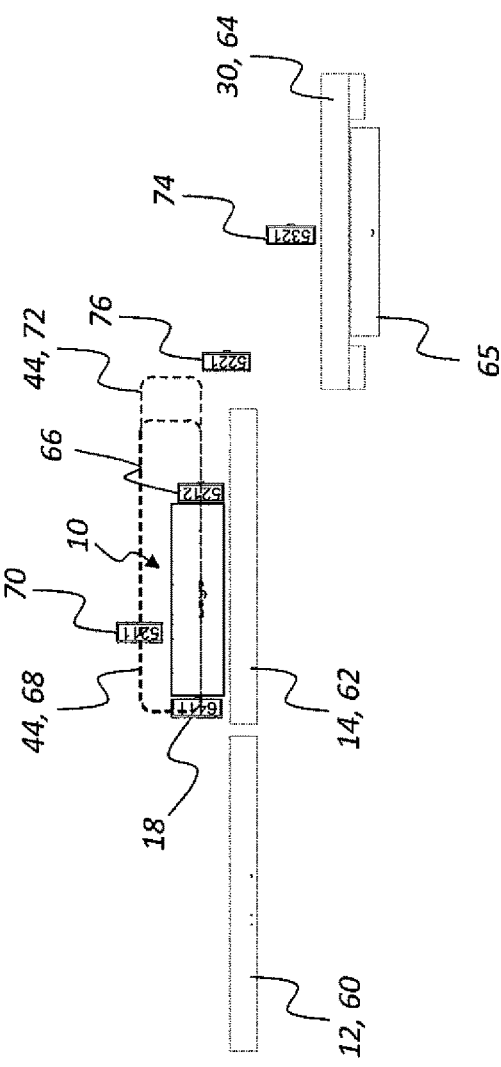

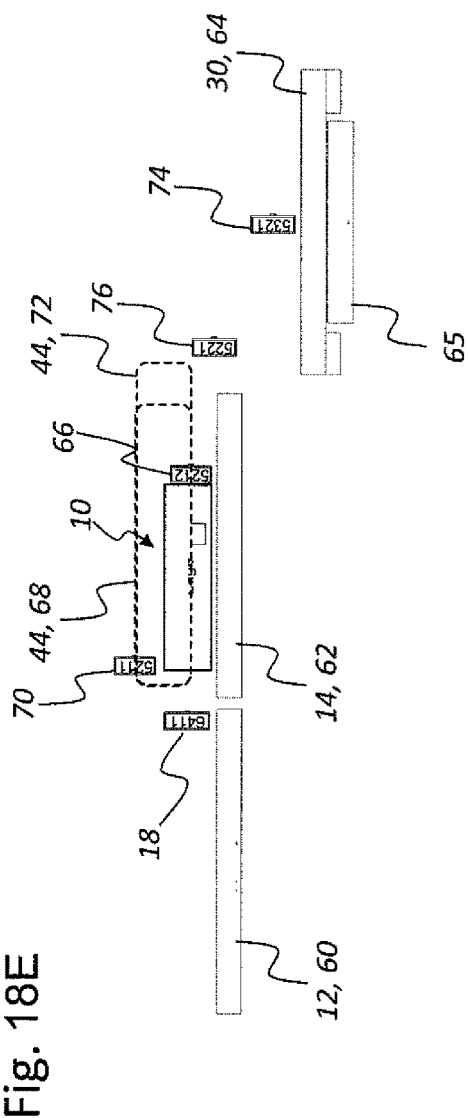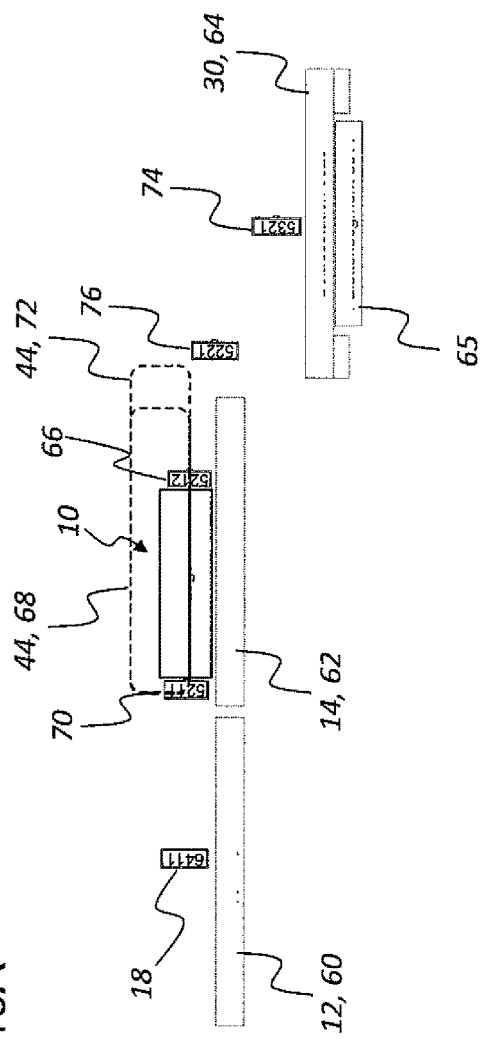

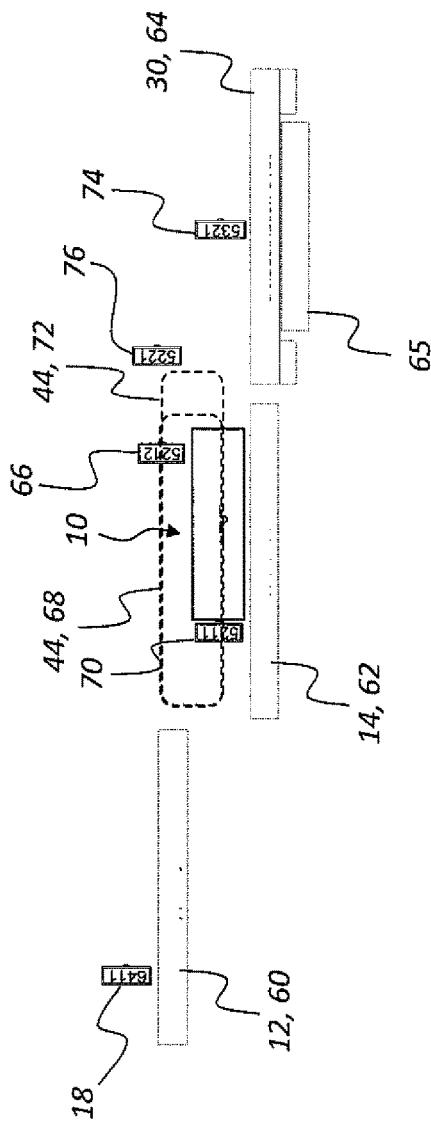
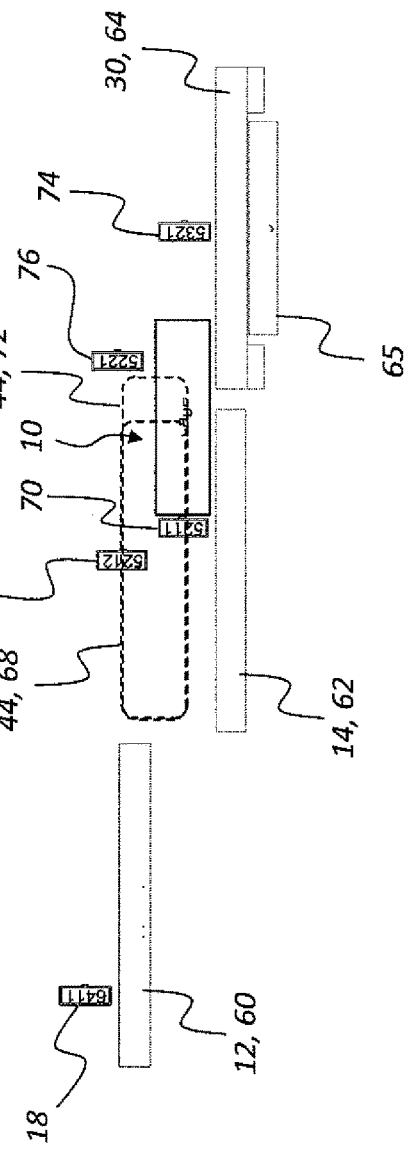
Fig. 19D
Fig. 20A

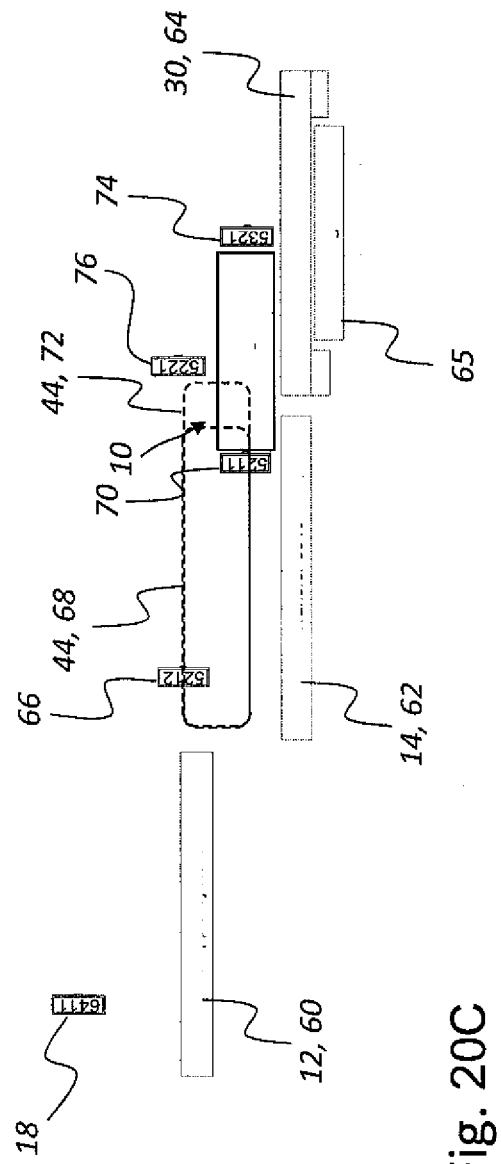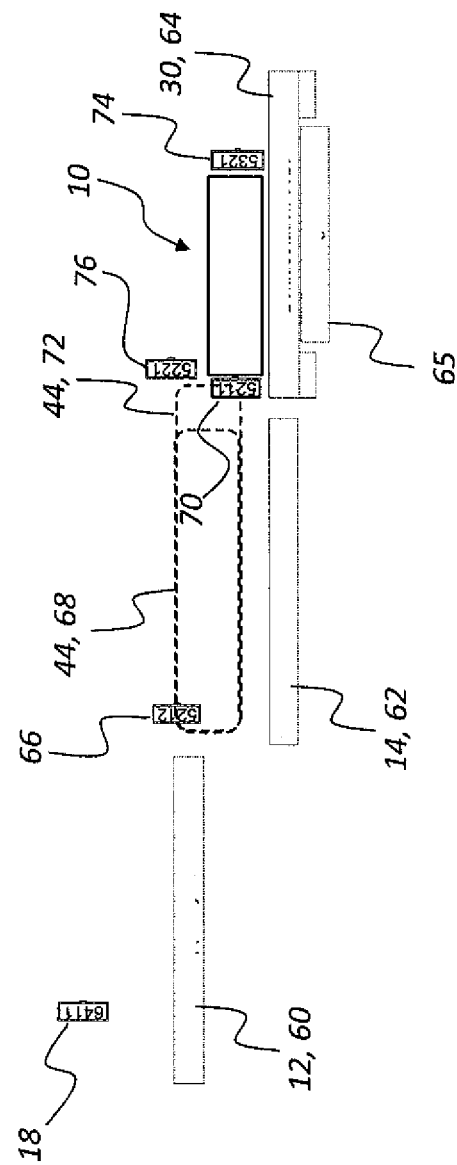

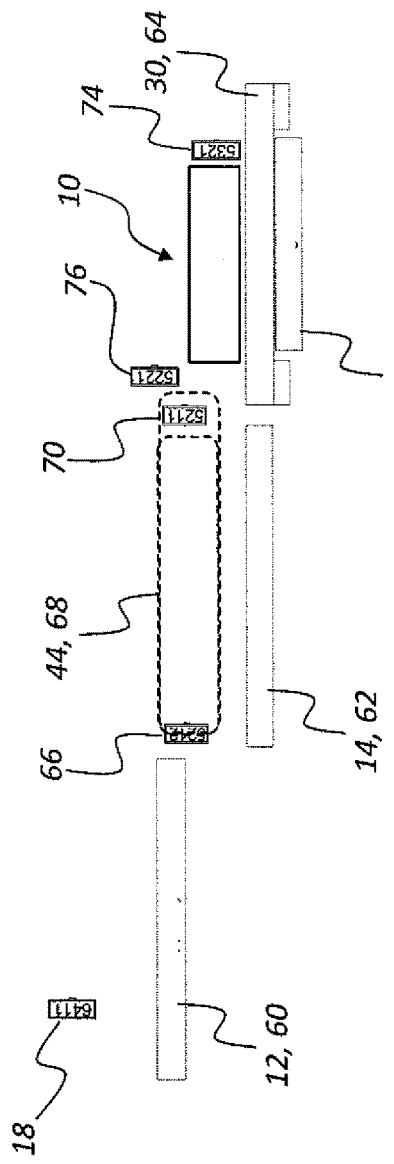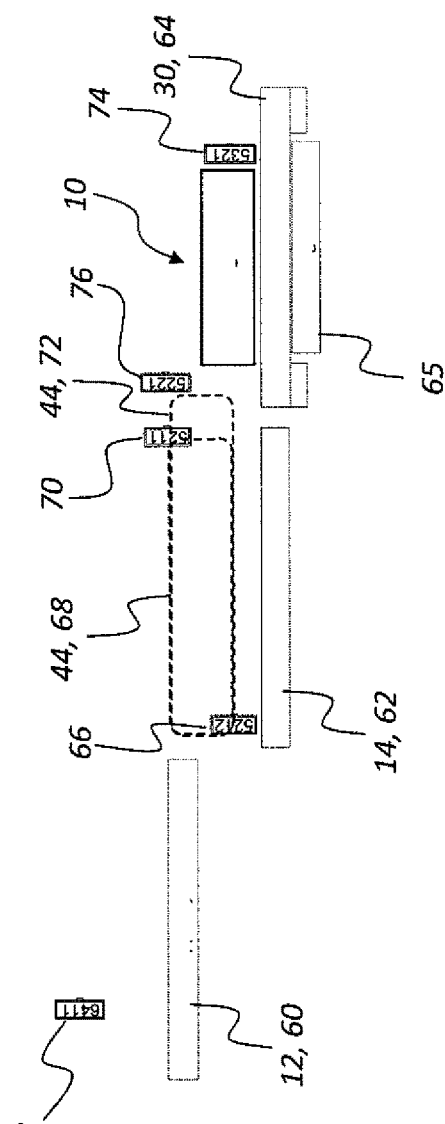

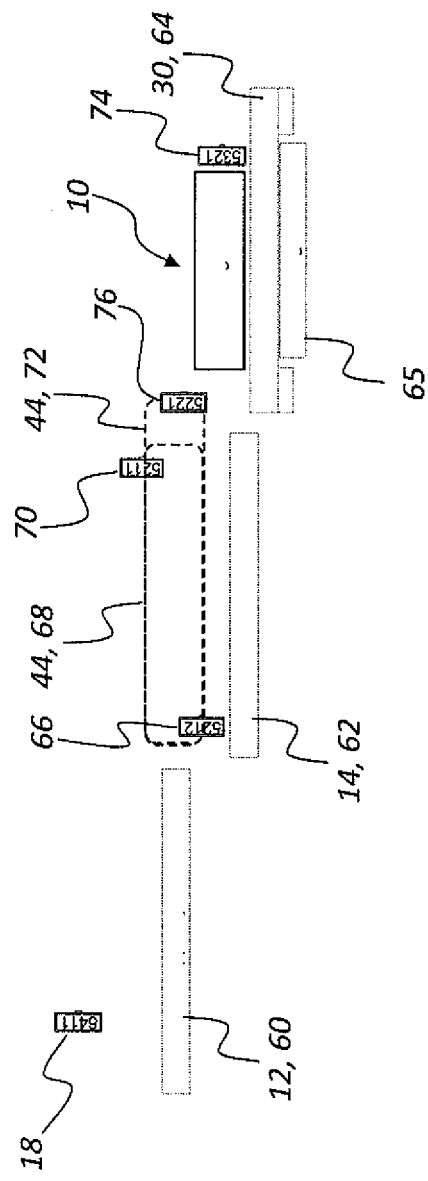
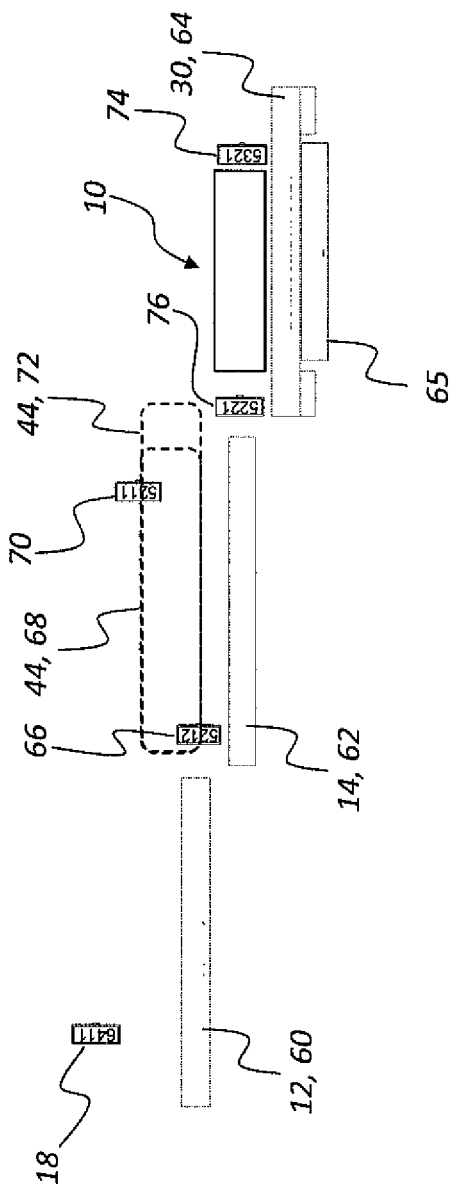

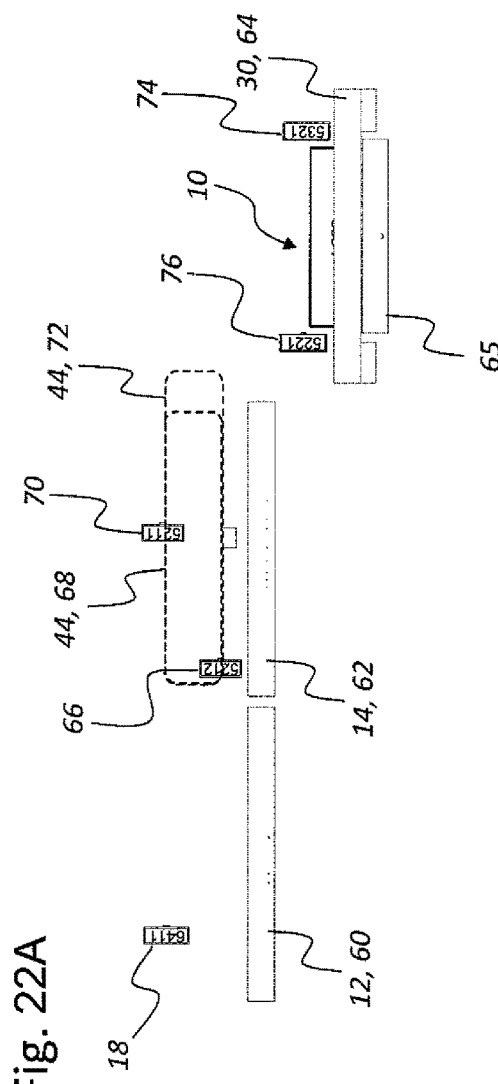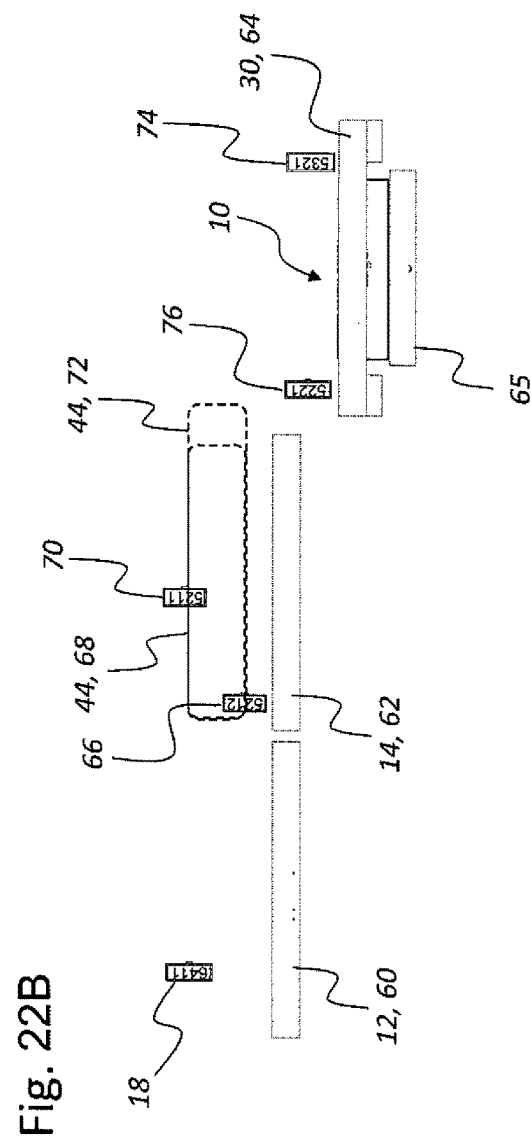

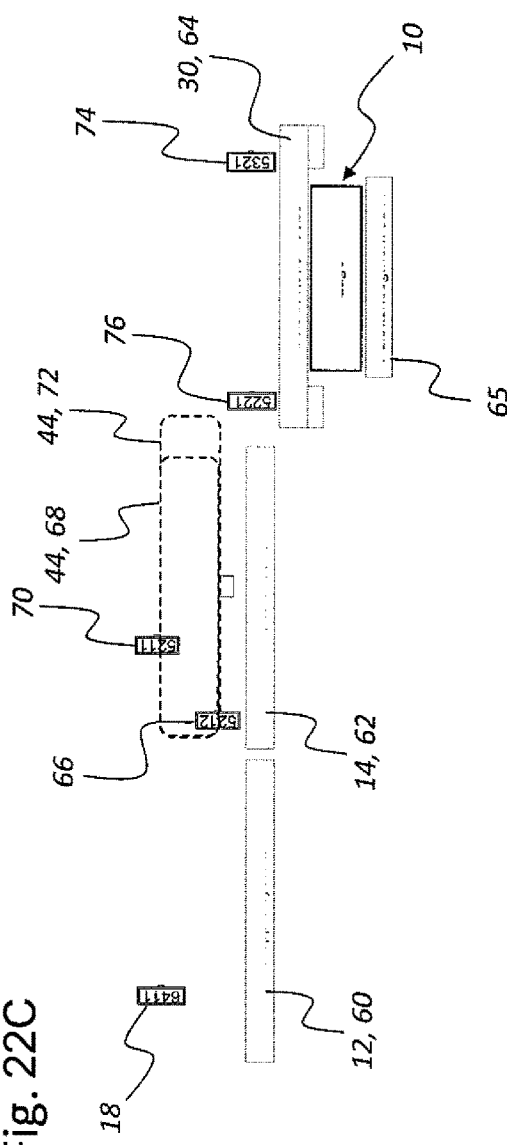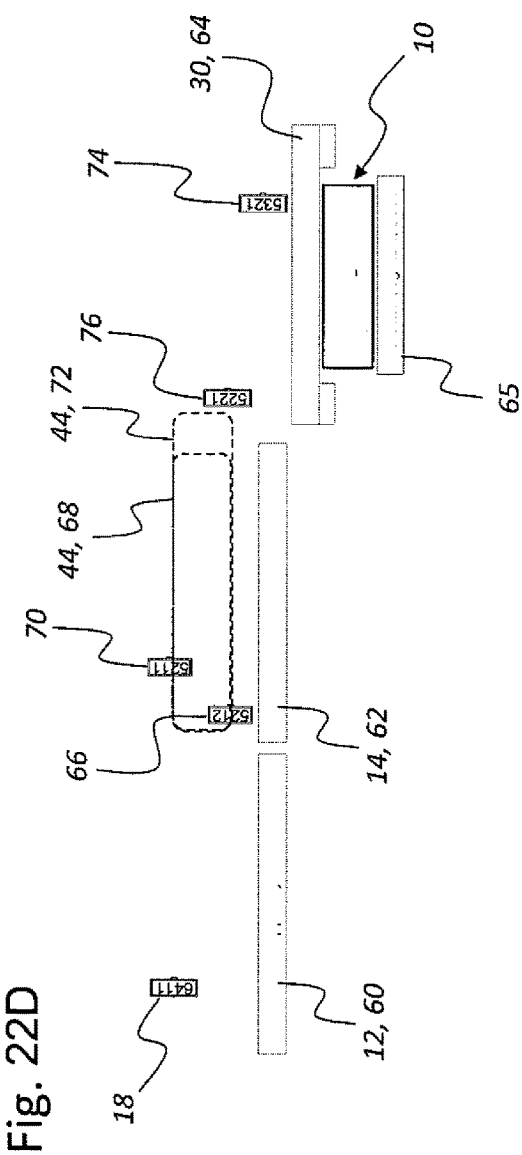

METHOD AND APPARATUS FOR TRANSFERRING ARTICLE LAYERS BETWEEN ADJACENT MODULES

This claims the benefit of German Patent Application DE 10 2012 204 013.7, filed Mar. 14, 2012 and hereby incorporated by reference herein.

The present invention relates to a method for horizontally shifting an article group by means of at least one pusher bar. The invention further relates to a corresponding apparatus.

BACKGROUND

Moving groups of articles by shifting them in a horizontal direction to a defined position by means of pusher bars or other suitable transfer means, or by movable support surfaces, involves a certain risk of the articles being dislodged in relation to each other within the group according to the speed of the shifting motion, in particular on reaching the end position. Under unfavorable conditions, in particular under rapid deceleration at the end of a transfer movement, individual articles may even topple over. In general, the risk of toppling over or becoming dislodged is greatest for the articles positioned foremost in transfer direction, and should this occur, disruption of the original pattern of the article layers and the desired arrangement would be the result. This is a limiting factor for the actual transfer speeds. Before reaching the desired end position it is particularly necessary to moderately reduce the speed in order to prevent a sudden deceleration and the ensuing risk of disruption of the layer pattern. A frame can be used to enclose and support the articles while being transferred, which will, however, result in other conveying or handling elements, such as lifting mechanisms, to be delayed until the frame is retracted out of the way. Simply placing the articles in a form-locking arrangement for transfer therefore will not lead to the benefit of increasing the overall performance of the palletizer or the like.

Patent DE 603 07 332 T2 discloses a device for transporting and boxing a group of objects that are held in a predefined position by means of a fixture device so that the objects remain arranged in a group while being conveyed. The aim is, in particular, to prevent the objects from falling over while being conveyed and transferred to a further packaging unit.

A method for forming, holding, separating, and transporting stacks downstream from a depositing device is also known from DE 41 17 434 A1. Several stack supports are used for stabilizing the stacks, and for this purpose they each follow the paths of motion of the stacks.

DE 44 35 981 A1 presents equipment for feeding objects to be packaged to a packaging machine. The objects are conveyed along a transport line and transferred into the packaging machine by means of pusher devices.

SUMMARY OF THE INVENTION

It is an object of the present invention to provide an universally employable method for different types of articles to be transported, said method having the purpose of transporting and transferring article groups in a predefined formation and allowing the transfer to be performed at a high speed without impairing the article formation. A further objective of the invention is to provide a corresponding conveying apparatus that is particularly suitable for palletizing and/or depalletizing article groups in a defined formation.

The present invention provides a method for horizontally shifting an article group from a first position and/or from a conveying movement into a second rest position by means of at least one pusher bar. This pusher bar, which is intended for shifting the article group, at least in sections, thereby engages with the articles located at the back of the article group as considered in relation to the conveying or feed direction and in this way shifts the entire article group, the articles expediently being supported by lateral guides in this conveyor section. The pusher bar engaging in the back of the article group and the lateral guides result in making it possible to largely maintain the relative positions of a plurality of articles in the article group to each other; i.e. the layer pattern of the shifted article group is largely maintained. The method according to the invention furthermore provides a support bar, which is at least temporarily allocated to the articles located at the front of the article group as considered in relation to the conveying direction, wherein said support bar moves ahead of the article group in a position at a slight distance from or abutting on the foremost articles at least immediately before or on reaching the rest position. According to the invention, the support bar is thus controlled in dependence on the conveying movement of the article group, the control method thereby comprising a motion control for the support bar when moving ahead of the article group at a slight distance from the foremost articles and a motion control for the support bar when abutting on the article group, at least immediately before or on reaching the rest position, thus contacting and stabilizing the said article group at least during the last phase of the deceleration process. The invention moreover may comprise another motion control variant for the support bar, wherein it initially stabilizes the article group during the deceleration process, but is already removed from the article group immediately before said article group reaches a standstill. This may be connected to the fact that the deceleration of the article group is not performed evenly, but rather becomes gradually smoother shortly before reaching the rest position in order to avoid a sudden, jerky stop of the article group. Even if it is preceded by a higher conveying speed and a more rapid deceleration phase, such a smooth stopping process allows the support bar to be removed earlier and to be accelerated quicker, thereby moving away from the article group, as it is no longer necessary for the support bar to be contacting the article group during the smooth motion immediately before standstill.

In the manner described, it is possible to prevent the articles positioned at the front of the shifted article group from becoming dislodged or toppling over on decelerating or stopping the article group, in particular on reaching the defined target position of the article group. In general, the individual articles of the conveyed article group are not only prone to destabilization during the phase of decreasing the transfer speed. Generally accelerating the article group or transferring it from one conveyor unit of the module to the conveyor unit of the next module can also cause individual articles to become dislodged or topple over, due to high transfer velocities or due to the passage from one conveyor to the next, and the motion control according to the invention for the support bar moving ahead and/or abutting on the article group is intended to prevent the dislodging or toppling over of the articles.

The pusher bar typically shifts the article group in relation to a support surface on which the shifted articles are glided along, causing a permanent sliding friction that leads to a frictional resistance between the gliding surfaces, i.e. between the base surfaces of the articles and the support surface. For this reason, a rapid deceleration of the article group may cause individual articles to topple over or to become dislodged in relation to adjacent articles, and this is reliably prevented by the support bar supporting the articles in the front of the article group. The modules, between which the articles are transferred, can optionally comprise their own drives and drivable support surfaces, for instance with so-called mat conveyors or the like, in order to optimally support the transfer movements of the articles. When using modules without drives, for instance so-called transfer systems or transfer tables or other such conveyor or lifting elements, the support surfaces on which the articles are shifted forward should be designed as frictionless as possible. It is possible to use, for instance, wooden boards or plastic boards, optionally comprising longitudinal profiles such as ridges, ribs, or grooves, for the support surfaces.

By transferring the articles in such an approximately form-locking arrangement or article group formation from one station to a following station, the method according to the invention allows, in particular, rapid decelerations, while a retainer bar or contact bar moving along together with the article layer in the direction of the feed motion also stabilizes the article layer during the other phases of a transfer movement. It is thus possible to transfer a layer of articles, bundles, or containers without the risk of bundles or containers toppling over. Transfer time can thereby be considerably reduced. It is no longer necessary for other axes (for instance lifting mechanisms) to be delayed after the transfer, until a frame, for instance, has been retracted to be out of the way of the other axes (for instance lifting mechanisms or the like). Another disadvantage in using a frame is that such a frame in turn needs to include additional constructions to enable adjustments to different sizes of article layers.

At least in phases and in particular at the end of a transfer movement, a second pusher bar can engage at the front (considered in relation to the transfer or conveying direction of the articles) at the same time as the first pusher bar engages at the back of the article group, and said second pusher bar, which can be regarded as a brake bar or a support bar, can be positioned optionally to abut on the front of the article group or at a slight distance from the front of the article group so that said second pusher bar moves ahead of the article group, either abutting on or at a slight distance from the article group, thus enabling a high transfer velocity and a rapid deceleration without the risk of disruption of the article formation by individual articles toppling over or becoming dislodged. In general, it will be sufficient for the second pusher bar or support bar to contact the front row of articles in an article group only toward the end of the transfer movement and in particular while decelerating the article group to a standstill, because it is essentially only during this phase that the front row of articles is prone to toppling over in feed direction, whereas phases of the transfer movement at an approximately constant transfer velocity cause no problems. As mentioned above, this applies at least to phases of constant transfer velocity. If the article layer is, however, subject to considerable accelerations and decelerations while being transferred, the support bar might already be required for stabilizing the article group during the transfer movement, in particular in phases of a more rapid deceleration. As such deceleration phases in the course of the transfer movement precede the braking operation up to immediately before standstill of the article group, individual articles may already become dislodged or topple over in these phases, and this can be reliably prevented by the support bar abutting on (or moving ahead at a slight distance) and thus supporting the articles in the front of the article group as considered in conveying direction. For such paths of motion it may be adequate to employ the support bar only during these described phases of rapid deceleration and to already remove said support bar from the articles during the last phase of smooth deceleration.

By moving the two bars approximately synchronously, at least during the deceleration of the article group, it is possible to provide stability to the articles and reliably maintain the article formation. The method according to the invention can generally be employed with any type of conveying movement of article groups or article layers or the like, for instance for palletizing or depalletizing such article layers or groups of articles, thereby largely maintaining the previous, intended article formation or layer pattern.

The article transfer can generally be performed between any type and variant of adjacent modules for handling equipment and/or packaging machines, conveyor units, or the like. It is possible, for instance, to transfer entire layer patterns or article layers from a conveying device, such as a mat conveyor or the like, which conveys the article layers in a horizontal direction, to a lifting device and/or transposing device, such as a shutter-type gripper head, which can stack several article layers on top of each other for palletizing. With the method according to the invention, it is optionally possible to perform transfers as part of depalletizing process from such a lifting device and/or transposing device, such as a shutter-type gripper head or the like, onto a horizontal conveying device.

The transfer can also be performed in multiple phases, for instance from a first to a second module and from there to a third module, thereby always utilizing the same transfer principles involving a pusher bar pushing from the back of the article group and, as the case may be, a support bar or brake bar supporting the article group in the front. Such a variant may allow for a transfer from, for instance, a horizontal conveyor, onto a lifting device and/or transposing device, which may comprise, for instance, a hoist, a lifting mechanism, or a swivable and/or liftable and lowerable arm. A subsequent third module may be, for instance, a stacking station for depositing the complete article layers on top of each other, wherein the second module can provide the proper height adjustment according to the so far obtained stacking height of the article layer on the third module so that it is possible to horizontally transfer the complete article layer from the second module onto the third module.

In general, the invention enables nearly any combination and arrangement variant of two, three, or more consecutive modules, and, as the case may be, also the integration of a consecutive stacking station or depalletizing station. The first module can be, for instance, a so-called layer forming belt or the like, from which the article layers are transferred to a second module, thereby changing the formation of the articles relative to each other as little as possible. Such a second module may comprise, for instance, a lifting mechanism for height adjustment. A third module, to which the article layer is subsequently transferred, can be, for instance, a loading station with a shutter gripper head or the like, which may be height variable like the second module, as the case may be, or spatially variable, for instance by comprising a robotic arm designed to be movable in various spatial directions. An alternative arrangement variant could essentially comprise two modules, with a first module being, for instance, the above-mentioned layer forming belt and a second module being a loading station with a shutter gripper head. The next module to follow after the second or third module—which is, according to the configuration, the loading station with a shutter gripper head, for instance—could be a stacking station, where the article layers can be transferred and preferably stacked on top of each other.

At least two pusher bars, which can be moved in parallel to the conveying direction of the article groups or article layers, may also be movable, as required, within defined movement spaces, said spaces optionally extending across the intersections between adjacent modules. According to an advantageous embodiment variant, it can be possible, as the case may be, for the pusher bar pushing the articles to advance, at least by a short section of the conveying path, into the module into which the article layer is being transferred. This can be, for instance, the mentioned lifting device and/or transposing device or, as the case may be, the shutter-type gripper head or the like. This transport module accordingly needs to be ready to receive the pusher bar at least for a short duration until the transferred article layer has come to a standstill and none of the articles are being decelerated any longer so that they are momentarily not prone to toppling over or becoming dislodged. In order to provide this movement space for the pusher bar, it is possible that said bar or its guiding elements optionally form a part of the second module, i.e. of the lifting device and/or transposing device or, as the case may be, of the shutter-type gripper head. However, as another option, it is also possible that the guiding elements responsible for driving the pusher bar and for motion control of said pusher bar reach into this second module at least during the transfer, this being achieved by using, for instance, a suitable linkage drive or linear drive or the like.

A corresponding motion control for the support bar decelerating the article layer or article group from the front is not needed, because the article layer, on being transferred from one module to an adjacent module, will be supported by the next support bar of the module into or onto which the article layer is being shifted so that the first support bar can move on to the intersection of the two adjacent modules. Optionally, the first support bar can also extend at least a short distance beyond this intersection into the second module before being returned for supporting a following article layer or article group.

There are various possibilities for driving and mounting the pusher bars. They can be, for instance, mounted on circulating chains, where they can circulate largely synchronously, each thereby moving along in feed direction at the same level as the articles that are being pushed or supported, and then being returned above or beneath the conveying level and against the conveying direction of the conveyed article layers. Each transport module and/or lifting module thereby preferably comprises a separate drive or circulating system for the pusher bars. Other drive or motion variants can, however, optionally be used for causing the pusher bars to respectively engage with or disengage from the article layers. For instance, the pusher bars can be moved into or out of the conveying path in perpendicular to the feed direction, optionally from above or below or from the sides. It is also possible to use combinations of the above-mentioned motion paths and/or motion controls.

The method described in the present invention involving article layers being transferred from one station to a next station or from one module to a next module—as the case may be, also involving height differences that have to be overcome, for instance when transferring into or out of a lifting mechanism or when using double lifting mechanisms or the like—is generally suitable for any type of transfer of article layers between two defined positions wherein the article layer is not only shifted but also stabilized in its formation by means of a further support element, which can be designed as a contact bar, a retainer bar, or a combination of a retainer bar and pusher bar, said support element or retainer bar counteracting toppling of articles, bundles, or containers. The method can be used in a palletizing system for introducing layers of bundles or containers, for instance. It can optionally be used in a depalletizing system for removing layers, for instance.

In the context of the present invention, the terms "articles" or "article layers" generally refer to diverse packed goods, for instance, individual boxes, beverage containers such as bottles, cans, or beverage cartons, piece goods, etc. that can be palleted, stacked, or depalleted in predefined arrangements. The term "articles" in this context can refer to bundles, for instance film-wrapped packs or strapped bundles or the like.

Furthermore, the present invention comprises an apparatus for horizontally shifting an article group or article layer, which is composed of a plurality of articles, between at least two adjacent modules while largely maintaining the relative positions of the said articles in the article layer or group to each other. The apparatus comprises at least one pusher bar engaging with the articles for horizontally shifting the article layer to an adjacent module and further comprising at least one support bar engaging with the articles at the front of the article layer, said support bar being at least temporarily coupled with the pusher bar while moving in transfer direction. In an apparatus according to the invention, the first module can be, for instance, a grouping table or the like, and the second module can be, for instance, a hoist or the like and/or a shutter-type gripper head. The third module can be, for instance, a further handling station that serves for transferring the article layers to the stacking station for depositing several article layers on top of each other.

Optionally, the first module can alternatively be a so-called layer forming belt, for instance, from which the article layers are transferred to a second module, thereby changing the formation of the articles relative to each other as little as possible. The second module may be, for instance, a lifting mechanism for height adjustment. In the context of the present invention, the term "height adjustment" in particular refers to a possibility to stack when transferring the article layers onto one of the modules. As palletizing commonly involves stacking article several layers on top of each other, it is necessary for at least one of the modules to be height adjustable. The height adjustability comprises both, the possibility to be lowered downward for transferring the article layers to a lower level and the possibility to be lifted upward, above the level of the first and/or second module, so that the transferred article layers can be deposited on top of the previously stacked article layers. Much the same applies for the process of depalletizing, as a stack of several article layers to be depalletized gradually becomes smaller according to the progress of removing the article layers, thus requiring the receiving module to be height adjustable.

A third module, to which the article layer is subsequently transferred, can be, for instance, a loading station with a shutter gripper head or the like, which can optionally comprise a robotic arm designed to be movable in various directions. The stacking station can be arranged subsequent to this third module. An alternative arrangement variant could essentially comprise two modules, with the first module being, for instance, the above-mentioned layer forming belt and the second module being a loading station with a shutter gripper head. In this embodiment variant, it is moreover possible that the first module, the above-mentioned layer forming belt, additionally comprises a lifting mechanism for height adjustment. The stacking station is commonly not a separate module in the sense of the present invention. The stacking station can be located in perpendicular alignment below the module formed by the loading station with a shutter gripper head. Optionally, the stacking station can also be located in an area immediately next to the module formed by the loading station with a shutter gripper head.

At least one of the pusher bars and/or at least one of the support bars can be optionally coupled with the drive of an endlessly circulating traction mechanism for generating the pushing motions. Other drives for the pusher and support bars are also possible, for instance linear drives.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

FIG. 1A and FIG. 1B show schematic views of the beginning of a transfer movement for transferring an article layer from one module to an adjacent second module.

FIG. 2A and FIG. 2B show views of the accomplished transfer movement according to FIG. 1A and FIG. 1B.

FIG. 3A and FIG. 3B show schematic views of a transfer movement according to the invention for transferring an article layer from one module to an adjacent second module.

FIG. 4A and FIG. 4B show the accomplished transfer movement according to FIG. 3A and FIG. 3B.

FIGS. 5A, 5B, 6A, 6B, 7A, 7B, 8A, 8B, 9A, 9B, 10A, 10B, 11A, 11B, 12A, 12B, 13A, 13B, 14A, 14B, 15A and 15B show several different, consecutive, schematic views of a transfer of an article layer involving three adjacent modules.

FIGS. 18A, 18B, 18C, 18D, 18E, 19A, 19B, 19C, 19D, 20A, 20B, 20C, 20D, 21A, 21B, 21C, 21D, 21E, 22A, 22B, 22C, 22D and 22E show schematic views of consecutive process steps in the transfer of an article layer involving three adjacent modules.

DETAILED DESCRIPTION

Figure 16:
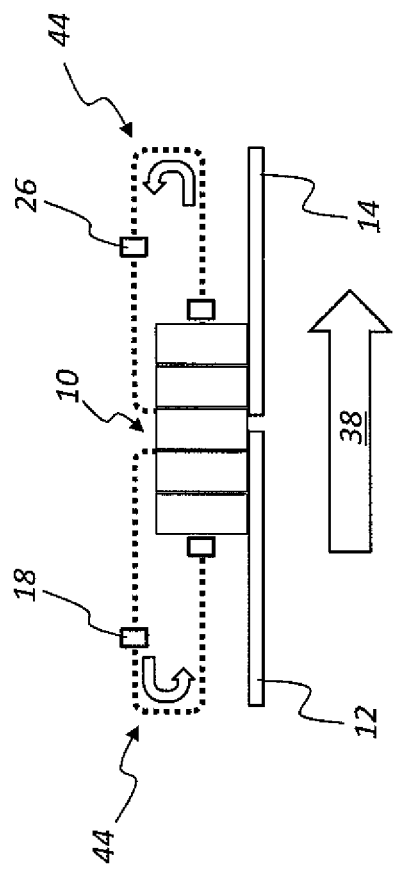
FIG. 16 shows a schematic view of an embodiment variant of two adjacent modules.

The same or equivalent elements of the invention are designated by identical reference characters. Furthermore and for the sake of clarity, only the reference characters relevant for describing the respective figure are provided. It should be understood that the detailed description and specific examples of the device and method according to the invention, while indicating preferred embodiments, are intended for purposes of illustration only and are not intended to limit the scope of the invention.

In a schematic top view (FIG. 1A) and a schematic side view (FIG. 1B), the illustrations in FIG. 1 show an article group or article layer 10 being horizontally shifted from a first position on a first module 12, for instance on a grouping table, which can be a part of a grouping system, to a second position on a second module 14, which can be, for instance, a lifting module or a loading station or the like. The article layer 10 shown here in the depicted exemplary embodiment comprises a plurality of articles 16 in a regular, rectangular arrangement, said articles 16 being intended to be pushed from the first module 12 onto the second module 14 by means of a pusher bar 18 without changing the pattern of the layer. The articles 16 can be, for instance, cartons, bundles of several individual articles or containers, or individual containers, which are standing next to each other in a regular arrangement. The articles 16 are typically higher than the length of a lateral edge of their base, making them susceptible to toppling over under rapid accelerations or decelerations. Even when this is not the case, i.e. for relatively short articles 16, it is still possible that the bundles or articles 16 drift apart or become dislodged at the transfer points, due to high accelerations, high transfer velocities, and rapid decelerations while transferring the article layer from one module to the next.

The pusher bar 18 intended for shifting the article group or article layer 10 engages with the articles 16 located at the back of the article group 10 as considered in relation to the conveying or feed direction 20 and in this way shifts the entire article group or article layer 10, which may have additional lateral guides for maintaining the pattern of the layer. These optional lateral guides are indicated by the reference character 17 in FIG. 1a and FIG. 2a. The pusher bar 18 engaging in the back of the article layer 10 and the lateral guides 17 arranged on both sides of the transfer path result in making it possible to largely maintain the relative positions of the plurality of articles 16 in the article group 10 to each other; i.e. the layer pattern of the shifted article group 10 is largely maintained along the feed path 20.

The embodiment variants in the following figures are to be understood to optionally include the lateral guides 17; for the sake of clarity they are, however, not illustrated here.

As illustrated in the schematic drawings in FIG. 2 with the top view in FIG. 2A and the lateral view in FIG. 2B, the feed motion 20 is not performed at a constant speed; instead the pushing motion 22 of pusher bar 18 becomes gradually slower, at least shortly before the article layer 10 reaches the defined target position on the second module 14, in order to avoid that the article layer 10 is abruptly stopped. Nevertheless, individual articles 16 positioned at the front of the shifted article layer 10 remain prone to becoming dislodged or toppling over on rapid deceleration or a sudden stop, in particular on reaching the defined target position of the article layer 10. This is due to the permanent sliding friction that leads to a frictional resistance between the base surfaces of the articles 16 and a support surface 24 when the article layer 10 is shifted in relation to the support surface 24 of the first and/or second module 12, 14 by the motion of the pusher bar 18, which typically performs a pushing motion and causes the shifted articles 16 to glide along said support surface 24. For this reason, a rapid deceleration of the article layer 10 may cause individual articles 16 to topple over or to become dislodged in relation to adjacent articles 16. The present invention aims to prevent such occurrences.

The schematic top views (FIG. 3A and FIG. 4A) and the schematic lateral views (FIG. 3B and FIG. 4B) in FIGS. 3 and 4 therefore illustrate an essential aspect of the method according to the invention in that it provides a support bar 26 that is at least temporarily allocated to the articles 16 located at the front of the article layer 10 as considered in relation to the conveying direction, wherein said support bar 26 moves ahead of the article layer 10 in a position at a slight distance from or abutting on the foremost articles 16 at least immediately before or on reaching the rest position. It is optionally possible to move the support bar 26 between two end positions in the section of the second module 14 in parallel to the feed motion 20 in such a manner that the pushing or forward motion 28 of the support bar 26 is performed at least temporarily in parallel to and in the same direction as the feed motion 20 of the article layer 10 and the pushing motion 22 of the pusher bar 18. In order to prevent the articles 16 that are positioned at the front of the shifted article layer 10 from becoming dislodged in relation to the other articles 16 or in relation to the intended layer pattern or to prevent them from toppling over, it is necessary that the pushing motion 28 of the support bar 26 is performed approximately synchronously with the pushing motion 22 of the pusher bar 18, at least during phases of rapid deceleration of the article layer 10 and/or in the final stage of the transfer movement and in particular in a phase of braking or decelerating the article layer 10 to slow down or come to a standstill. As already mentioned and according to the path of the feed motion 20 of the article layer 10, the support bar 26 may also be distanced from the article layer 10 before said article layer 10 comes to a standstill, with the support bar 26 moving in the direction of the arrow 28 and being accelerated at the same time. By controlling the motion of the support bar 26 in such a way, the support bar 26 can initially stabilize the article layer 10 during the process of deceleration, but it can also be removed from article group or the layer 10 immediately before reaching standstill. This may be connected to the fact that the deceleration of the article layer 10 is not performed evenly, but rather becomes gradually smoother shortly before reaching the rest position in order to avoid a sudden, jerky stop of the article layer 10. Even if it is preceded by a higher conveying speed and a more rapid deceleration phase, such a smooth stopping process allows the support bar 26 to be removed earlier and to be accelerated quicker in the direction 28, away from the article layer 10, as it is no longer necessary for the support bar 26 to be contacting the article layer 10 during the smooth motion immediately before standstill.

As schematically illustrated by FIGS. 3 and 4, the method according to the invention allows very quick transfer and feed motions 20 and relatively rapid, subsequent decelerations, as the retainer or support bar 26 moves along together with the article layer 10 in the direction of the feed motion 20 and thus secures and stabilizes the article layer 10 in the depicted, approximately form-locking arrangement of articles 16 during transfer of the article layer 10 from one station (module 12) to an adjacent station (module 14). Even if they are not included in these figures, lateral guides for the article layer 10 are useful in this case, too. In general, it will be sufficient for the second pusher bar or support bar 26 to contact the articles 16 positioned foremost in the article layer 10 only toward the end of the transfer movement and in particular while decelerating the article layer 10 to a standstill (see FIG. 4A and FIG. 4B), because it is essentially only during this phase that the front row of articles 16 is prone to toppling over in feed direction.

As shown in FIG. 5A to 15B by an exemplary embodiment, it is also possible to perform the transfer in several phases, namely from a first module 12 onto a second module 14 and from there onto a third module 30 (see FIG. 10A to 15B), wherein the same principles apply to each transfer with the pusher bars 18 pushing the articles 16 from the back and, if applicable, the contact, brake or support bars 26 supporting the articles 16 from the front. In such a variant it is possible, for instance, that the first module 12 is a grouping table 32 or a so-called layer forming belt or the like, from which article layers 10 are transferred onto a second module 14, being a lifting device and/or a transposing device, which is formed, for instance, by a hoist 34, a lifting apparatus, or a swivable and/or liftable and lowerable arm of a loading apparatus or the like, which is not illustrated here. The subsequent third module 30 can be, for instance, a loading station with a shutter gripper head or the like (see FIG. 17), or optionally a stacking station 36, a loading station, or a pallet loading station, or the like, for depositing the complete article layers 10 on top of each other, wherein the second module 14 or, as the case may be, the hoist 34 can provide the proper height adjustment for the article layer 10 according to the obtained stacking height on the third module 30 or, as the case may be, on the stacking station 36 so that it is possible to horizontally transfer the complete article layer 10 from the second module 14 or, as the case may be, from the hoist 34, onto the third module 30 or, as the case may be, onto the stacking station 36. All modules 12, 14, and 30 can each be optionally equipped with a track drive in the form of a suitable horizontal conveying system. Each of these track drives can be controlled separately, and the drive speed should be adjusted to the feed speed of the pusher bars 18 and the support bars 26. The speed of the conveyor belt is normally lower than or equal to the transfer speed. In most cases, the conveyor belt speed is lower than the transfer speeds because such conveyor belts are commonly not intended for high speeds, such as are desirable in transfer processes.

When employing modules 12, 14, and/or 30 without own track drives, the support surfaces on which the article layers 10 are shifted forward should be appropriately smooth and frictionless. It is possible to use, for instance, wooden boards or plastic boards, optionally comprising longitudinal profiles 37 such as ridges, ribs, or grooves, for the support surfaces, which are for example shown schematically in FIG. 3A.

In this context it should be mentioned that the present invention and the interaction of pusher bars and support bars according to the invention can be operated successfully regardless of whether the third module is a moving station, for instance a loading station with a shutter gripper head or the like or whether it is a fixed stacking station (as exemplified in FIG. 3 and the following). The terminology for the first, second, and third modules are therefore to be regarded predominantly as placeholders for different handling stations involved in the depicted transfer movements of the complete article layers 10, said movements being effected without causing the individual articles to become dislodged, topple over, or leave the formation of articles in some other way.

In FIG. 5A to 15B described in the following, the upper illustrations each show schematic top views (FIG. 5A, FIG. 6A, etc.) and the lower illustrations schematic lateral views (FIG. 5B, FIG. 6B, etc.), respectively, of the same process phase of the article layer 10 being transferred between modules.

FIG. 5 shows two views of the beginning of a transfer movement for transferring article layer 10 from the grouping table 32 to the hoist 34. The pusher bar 18, which is allocated to the grouping table 32, is positioned on the left side behind the article layer 10, so that the pusher bar 18 can push the article layer 10 to the right in the feed direction 38 onto the hoist 34. The counter support bar or support bar 26 is positioned at the left edge of the support surface of the hoist 34, ready for contacting the article layer 10 after the beginning of the transfer of said article layer 10 onto the hoist 34, as shown in the two views in FIG. 6. The grouping table 32 and the hoist 34 are positioned at the same height, so that the pusher bar 18, which is allocated to the grouping table 32, pushes the article layer 10 onto the hoist 34, while the support bar 26, which is allocated to the hoist 34, moves ahead of said article layer 10, either abutting on or at a slight distance from the article layer 10. The two bars 18 and 26 perform the feed motions largely synchronously.

According to the two views depicted in FIG. 7, the article layer 10 has been completely pushed onto the hoist 34, with the support bar 26 forming a counter support in front of the layer 10 and securing it against bundles or articles 16 toppling over due to the necessary deceleration of the transfer movement. The pusher bar 18 of the first module 12 or, as the case may be, of the grouping table 32, has reached its end position and is stopped while the support bar 26 is shifted to its end position at the front edge of the support surface of the hoist 34 (see FIG. 8). According to FIG. 8, the lifting mechanism of the hoist 34 can now be lowered or raised to adjust the hoist 36 to the level of the third module 30 or, as the case may be, of the stacking station 36. The pusher bar 18 returns to its initial position against the feed direction 38 of the article layer 10, with the support bar 26 still remaining in place at first, as it has already fulfilled its function of stabilizing the decelerated articles 16.

As illustrated by the two schematic views in FIG. 9, the pusher bar 18 continues its return movement, while the support bar 26 is now also returned to its initial position against the feed direction 38. Since the article layer 10 is still positioned on the meanwhile lowered hoist 34, the support bar 26 cannot be returned on the same level; instead it can be raised, for instance, according to FIG. 9b and then be returned above the article layer 10 in the direction of the arrow. Another option would be to lower the support bar 26 and return it below the hoist 34, or the support bar 26 could be removed laterally from the engagement area with the articles 16 and then be shifted against the feed direction 38 in a suitable manner. This return movement of the support bar 26 makes it possible to use said support bar 26 as pusher bar 27 in the subsequent transfer movement according to FIG. 10. The article layer 10 can then be transferred onto the third module 30 or, as the case may be, to the stacking station 36, where another support bar 40 provides contact and stabilizes the front articles 16 of article layer 10 while being transferred, as shown in the FIGS. 11 and 12. The support bar 26, which previously served as pusher bar 27 for the hoist 34, pushes the article layer 10 from the back in the feed direction 38 (FIG. 10, FIG. 11), while the support bar 40 of the stacking station 36 serves as contact or support in the front of the article layer 10 (FIG. 11). At least in phases, the two bars 27 and 40 perform these movements in the feed direction 38 in synchrony with the article layer 10 being transferred. The first module or, as the case may be, the grouping table 32, is not shown in the FIGS. 11 to 14, because the further transfer movement of the article layer 10 to the stacking station 36 no longer involves the first module or the grouping table 32.

As soon as the pusher bar 27 of the hoist 34 has reached its end position and the article layer 10 has been nearly completely transferred onto the stacking station 36, as illustrated in FIG. 13, the hoist 34 can be raised or lowered, according to the respective phase of the stacking process and according to the number of article layers 10 stacked on top of each other, to return the hoist 34 to its previous position and adjust it to the same level of the grouping table 32. According to FIG. 14, it is additionally possible to return the pusher bar 27 against the feed direction 38, so that said pusher 27 can then again be used as a support bar 26 for the next article layer 10 being transferred from the first module 12 or the grouping table 32. The illustration in FIG. 14 shows an additional pusher bar 42, which is allocated to the third module 30 or, as the case may be, to the stacking station 36, and which is used for the final positioning of the article layer 10 by pushing said article layer 10 forward for a short distance in the feed direction 38 until the article layer 10 is located in its intended position on the stacking station 36. While the lifting mechanism of the hoist 34 is already being raised again (see FIG. 14B), this additional pusher bar 42 of the stacking station 36 must be returned to its original position behind the article layer 10 so that the pusher bar 42 can push the article layer 10 forward for the remaining, short distance (see FIG. 15).

The two bars 40 and 42 can move synchronously and finally stop when the article layer 10 has reached the end position required for stacking. As the hoist 34 is no longer required for positioning the article layer 10 at this point, it has not been included in the illustration in FIG. 15. It is, however, not absolutely necessary for the two bars 40 and 42 to move synchronously. Optionally, their movements can be controlled so that the brake bar 40 initially moves in synchrony with the pusher bar 27 while maintaining a certain distance to the front row of the article layer 10. Shortly before reaching the end position, the brake bar 40 can then be decelerated until it comes to a standstill in front of the article layer 10 in its end position. During this decelerating phase, the distance between the front article row of the article layer 10 and the brake bar 40 is gradually decreased so that in the end position the article layer 10 abuts on the brake bar 40 (see FIG. 13 and FIG. 14).

The drive of the respective pusher bars or support bars can be effected in various ways, for instance by means of linear drives or drives for a circulating traction mechanism 44 according to FIG. 16. Preferably, there are one or several bars arranged on such a chain or belt circulation to enable speedy transfer of the article layer from one of the modules to the next module. The individual modules 12, 14, and 30 can optionally comprise their own belt drives or other drivable support surfaces that are movable in or against the feed direction 38, said drives or drivable support surfaces each being expediently movable in synchrony with the movable pusher bars and support bars in order to optimally support the article conveyance. The schematic lateral view of FIG. 16 shows such an embodiment variant in which the pusher bars 18 and the support bars 26 of consecutive modules 12 and 14 are each moved by drives for endlessly circulating traction mechanisms 44, wherein it is possible to vary the circulation speeds of the said drives (44) in a desired manner for controlling the motions of the pusher bars 18 and the support bars 26 so that the article layer 10 can be shifted in the feed direction 38 between the modules 12 and 14 according to the intended path of motion. As illustrated in FIG. 16, it is possible, for instance, to move two pusher bars 18 or two support bars 26 each in the direction of the arrows along each of the circular trajectory paths of the traction mechanism drives 44, thus enabling control of the transfer of the article layer 10 between the consecutive modules 12 and 14 in the desired manner.

Figure 17:
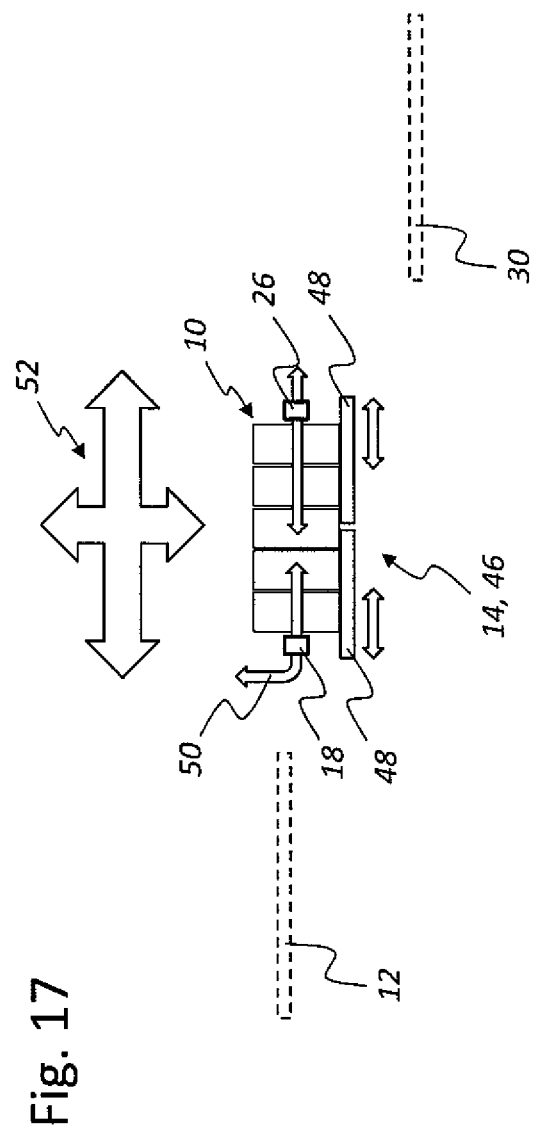
FIG. 17 shows a schematic illustration of an embodiment variant of a lifting module designed with a shutter-type gripper head.

The schematic illustration in FIG. 17 shows a further embodiment variant of a second module 14, which is designed as a shutter-type gripper head 46 or the like and which can serve for transposing the article layers 10 between the adjacent modules 12 and 30, by transposing, for instance, the article layer 10 between the first module 12, which is designed, for instance, as a grouping station, and the third module 30, which is designed, for instance, as a stacking station. The support surface of the shutter-type gripper head 46 typically comprises movable elements 48, which are optionally horizontally shiftable rollers or panel segments or the like, wherein said movable elements 48 can be moved apart horizontally for setting down the article layer 10, and at the same time the two pusher bars 18 and support bars 26 respectively hold and stabilize the article layer 10 at the sides. In the schematic lateral view of FIG. 17, the two movable elements 48 are moved together so that they abut on each other and thus form the support surface for carrying the article layer 10.

The support bar 26, which is arranged to the right of the article layer 10 in FIG. 17, can also be shifted in the previously described manner in a horizontal direction so that is has a stabilizing and braking function for the articles 16 while the article layer 10 is being transferred onto the module 14 and, in particular, while the article layer 10 is being decelerated, so that the support bar 26 prevents the articles 16 in the front, as considered in the feed direction, from toppling over. The pusher bar 18, which is arranged to the left, can additionally be moved along a horizontal and, in sections, vertical shift path 50, making it possible, on the one hand, to push the article layer 10 in the feed direction 38. It is, however, necessary to move the pusher bar 18 away from the collision zone with the article layer 10 while said article layer 10 is being transferred from the first module 12 onto the second module 14, which is why said pusher bar 18 can also be raised in a vertical direction, as required, to be removed from the transfer path. The double arrow 52 indicates that the second module 14 or, as the case may be, the shutter-type gripper head 46 can be shifted both in a horizontal and in a vertical direction.

Other arrangements, variants, and paths of motion are conceivable for the modules 12, 14, and 30 as well as for the pusher bars and support bars 18, 26, 40, and 42, in order to obtain the desired result. It may thus be possible for the two or more pusher bars 18, 27, etc. and/or support bars 26, 40, which can be moved in parallel to the conveying direction of the article groups or article layers 10, to also be movable, as required, within defined movement spaces, said spaces optionally extending across the intersections between adjacent modules. According to an optional embodiment variant, in particular the second pusher bar or support bar moving ahead of the articles and serving as front support means may advance, by at least a short section of the conveying path, inside the module into which the article layer 10 is being transferred. This can be, for instance, the mentioned lifting device and/or transposing device or, as the case may be, the shutter-type gripper head 46 or the like. This transport module accordingly needs to be ready to receive the second pusher bar or support bar, at least for a short duration, until the transferred article layer 10 has come to a standstill and none of the articles are being decelerated any longer so that they are momentarily not prone to toppling over or becoming dislodged. In order to provide this movement space for the pusher bar or support bar, it is possible that said bar or its guiding elements optionally form a part of the second module 14, i.e. of the lifting device and/or transposing device or, as the case may be, of the shutter-type gripper head 46. However, as another option, it is also possible that the guiding elements responsible for driving the second pusher bar or support bar and for motion control of said bar reach into this second module at least during the transfer, which can be achieved by using, for instance, a suitable linkage drive or linear drive or the like.

The schematic views of FIGS. 18 to 22 illustrate, by a total of twenty-three individual drawings, a further exemplary embodiment of consecutive process steps for the transfer of an article layer 10 between three adjacent modules 12, 14, and 30. In this exemplary embodiment, the first module 12, always presented on the left of each figure, is formed by a grouping system 60 as described in the previous exemplary embodiments, and said grouping system takes over an article layer 10 in a predefined formation from a sorting system located upstream from the grouping system. Such a sorting system can comprise, for instance, one or several handling robots for forming complete article layers 10 of articles coming from one or several article feeds, said article layers 10 then being transferred in the described manner onto the first module 12 or, as the case may be, onto the grouping system 60. The grouping system 60 is not necessarily adjustable in height or laterally shiftable, but can also be arranged to be a stationary system, as illustrated in the FIGS. 18 to 22. As another option, the grouping system 60 can be height adjustable, in particular if a transfer table 62 located downstream from the grouping system 60 is optionally dispensed with. Such a configuration makes it possible to have the height adjustable grouping system 60 ready for immediate transfer of the article layers 10 to the loading station 64. In this instance, the pusher bars 70 and support bars 66, which are normally allocated to the transfer system, are in this case allocated to the grouping system 66, and their movements are controlled in a suitable manner, making the transfer system dispensable without limiting the functionality.

The illustration in FIG. 18A shows an article layer 10 on the first module 12 or, as the case may be, on the grouping system 60, wherein said article layer 10 can be shifted to the right by means of a horizontally movable first pusher bar 18 onto a second module 14 at the same height as the first module 12 or grouping system 60, as shown in FIG. 18B. The second module can be formed, for instance, by a so-called transfer table 62, which is designed to be height adjustable so as to enable a transfer onto a loading station 64 that is located at a lower level than the grouping system 60. This loading station 64, which can be adjusted in height according to the load state of a pallet segment 65 arranged below it, forms the third module 30 in the depicted exemplary embodiment. As illustrated in the FIGS. 18a to 18e, the article layer 10 is transferred from the first module 12 or, as the case may be, from the grouping system 60 in a horizontal direction to the right onto the second module 14 or, as the case may be, onto the transfer table 62, by means of the first pusher bar 18, which is allocated to the first module 12, wherein a first support bar 66, which is allocated to the transfer table 62, stabilizes the front articles of the transferred article layer 10 and prevents individual articles from becoming dislodged or toppling over. The first support bar 66 moves approximately along the entire length of the second module 14 or, as the case may be, the transfer table 62, as illustrated in the FIG. 18B to 18E. FIG. 18D additionally shows a special feature of this embodiment variant in which the first pusher bar 18 is pushed beyond the grouping system 60 across to the edge of the transfer table 62 before being retracted according to FIG. 18E (see also FIG. 19) so that it can transfer another article layer 10 from the first module 12 or, as the case may be, from the grouping system 60 onto the second module 14 or, as the case may be, onto the transfer table 62.

Figure 19B:
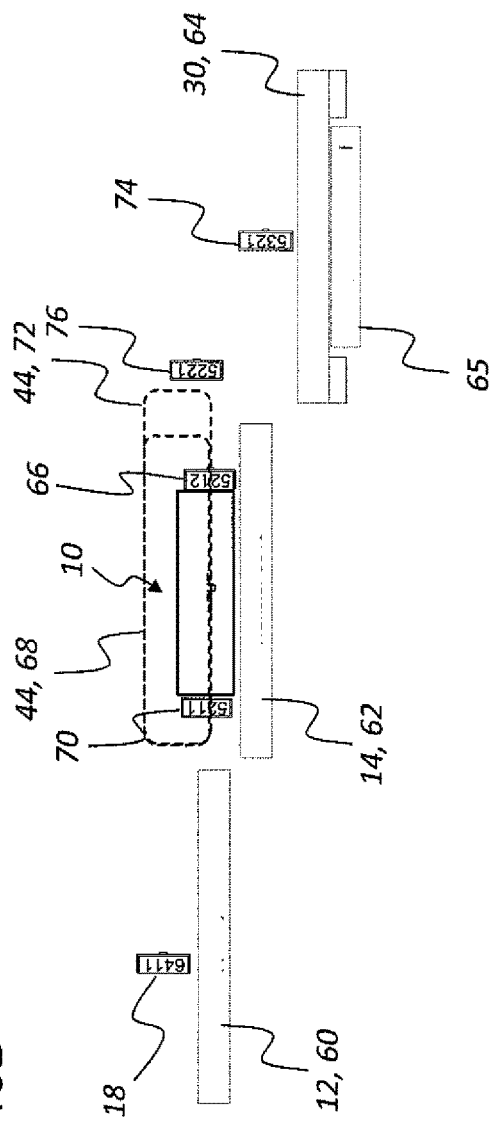
Figure 19C:
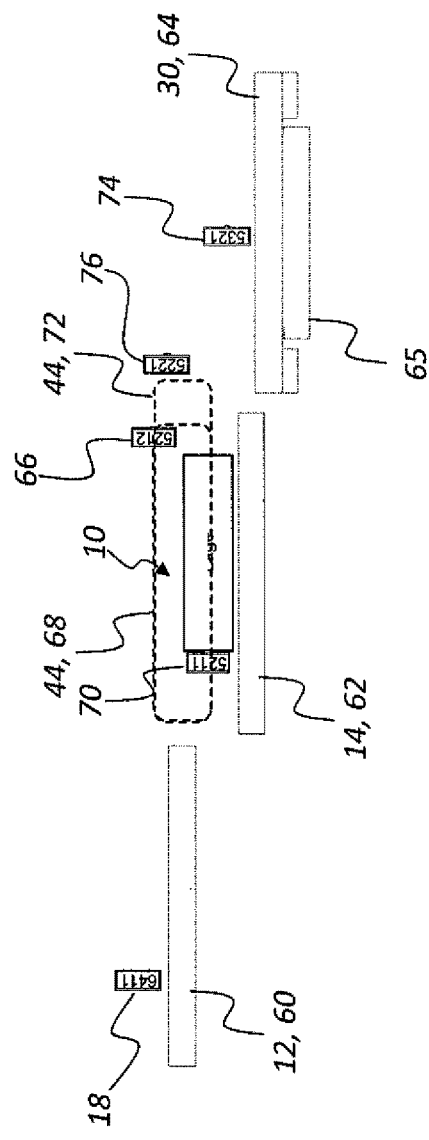
Figure 21D:
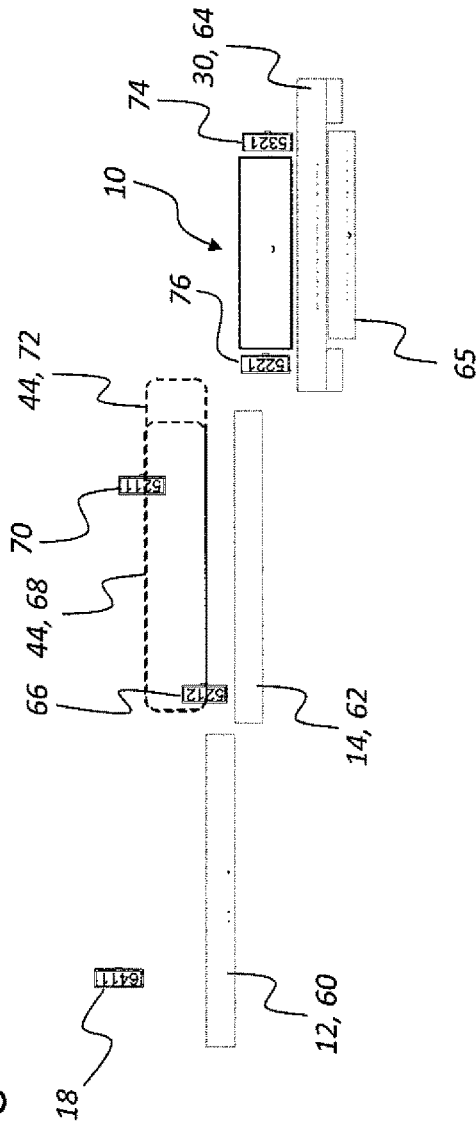
Figure 21E:
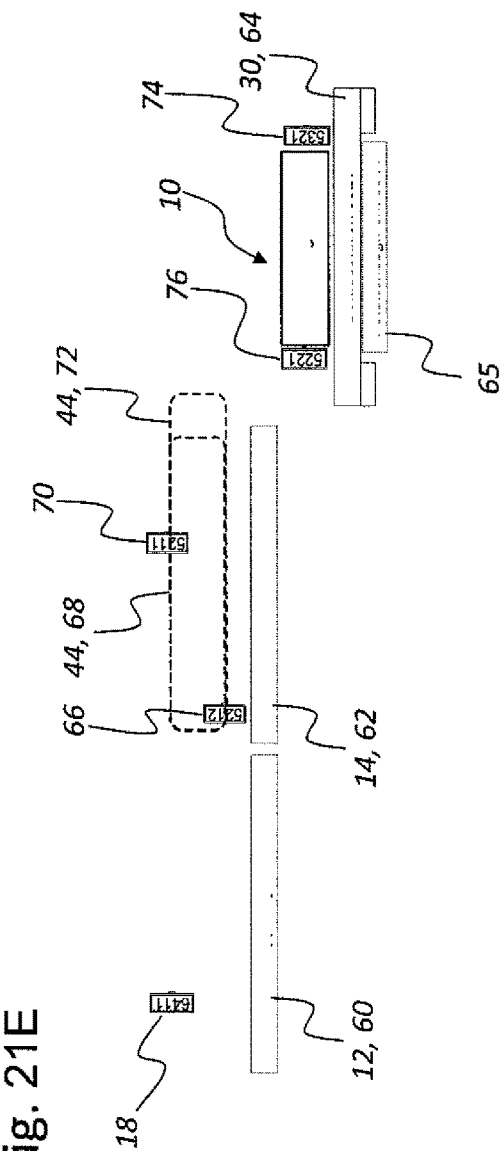

In the illustrations of the FIGS. 18A to 18E, the first support bar 66, which is allocated to the transfer table 62, moves in horizontal direction to the right until the article layer 10 has been completely transferred onto the transfer table 62 or, as the case may be, onto the second module 14, according to FIG. 19A and FIG. 19B. FIG. 19C illustrates the subsequent vertical movement of the support bar 66, which is raised so as not to interfere with the further transfer of article layer 10. The support bar 66 thereby describes a closed first trajectory path 68, which may be predefined, in particular, by a corresponding traction mechanism drive 44. The drawing in FIG. 19D illustrates the return movement of the first support bar 66 above the article layer 10 to the left, said return movement being continued in FIG. 20A and FIG. 20B until the support bar 66 reaches its initial position and can again be used for stabilizing another transferred article layer 10.

The FIGS. 18A to 18E furthermore illustrate another pusher bar 70, which is allocated to the transfer table 62, said pusher bar 70 being shifted above the article layer 10 along a second trajectory path 72, wherein the pusher bar 70 requires its own, independent traction mechanism drive 44 for tracing a path of motion which deviates in some sections from the first trajectory path 68, even if the second trajectory path 72 is perhaps otherwise substantially overlapping with large portions of the first trajectory path 68. The FIGS. 20B, 20C, and 20D thus illustrate a shift path of the first pusher bar 70 that extends beyond the length of the transfer table 62 and partly extends into the area of the loading station 64 of the third module 30. By having this extended shift path, it is possible for the further pusher bar 70 to transfer the article layer 10 from the second module 14 onto the third module 30 in a single move without needing to interrupt the transfer movement.

As the article layer 10 continues to be shifted along the transfer table 62, being pushed by means of the further pusher bar 70 and stabilized by the first support bar 66, said transfer table 62 is lowered (see FIGS. 19B to 19D) to the level of the loading station 64 beneath it (FIG. 19D) so that the article layer 10 can be transferred to the right onto the loading station 64 (see FIGS. 20A to 20C) by means of the other pusher bar 70 (FIG. 19D). A second support bar 74 is allocated to this loading station 64 and is moved approximately synchronously, at least in sections, with the further pusher bar 70 to the right, thereby moving ahead of the article layer 10, thus providing stability to the said article layer 10 and preventing individual articles from toppling over or becoming dislodged. After contacting the article layer (FIG. 20B), the second support bar 74 moves ahead of the article layer 10 while the article layer 10 is transferred to the right (FIG. 20C) until the further pusher bar 70 has completed its transfer movement and is moved vertically upward along the second trajectory path 72 in the area of the loading station 64 (FIG. 20D).

Figure 22E:
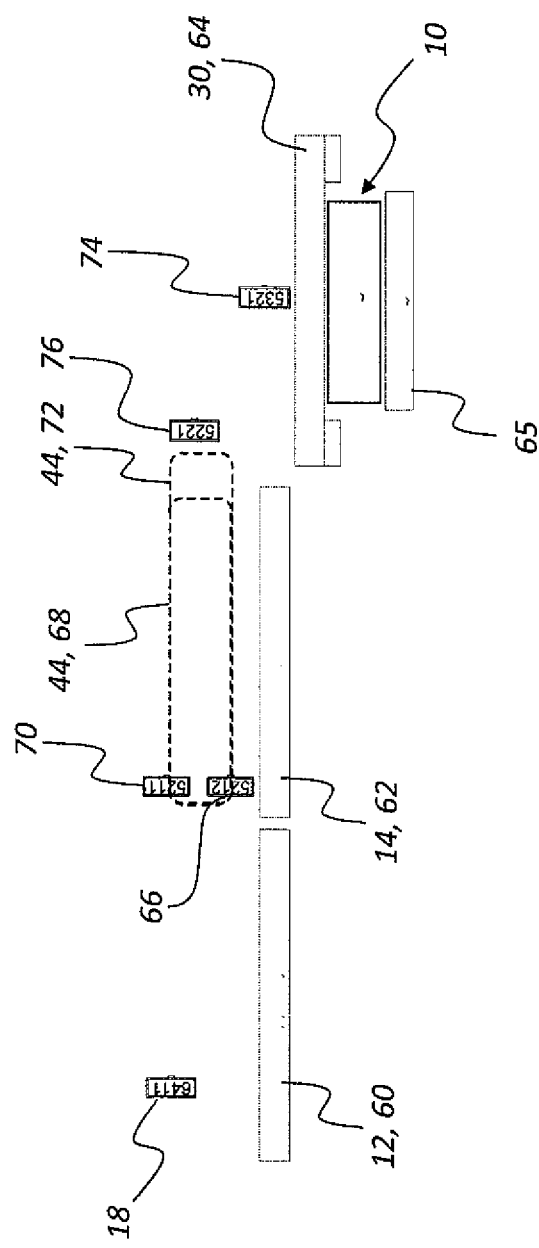

While the transfer table 62 can be returned vertically upward after the transfer of the article layer 10 onto the loading station 64 (FIG. 21A, FIG. 21B), a third pusher bar 76, which is allocated to the loading station 64, is lowered vertically downward (FIG. 21B) to the level of the article layer 10 (FIG. 21C) and subsequently shifted to the right (FIG. 21D) for centering the article layer 10 on the loading station 64 (FIG. 21E), while the second support bar 74 provides stabilization for the article layer 10 at the same time. After correctly positioning the article layer 10 (see FIG. 21E), the loading station 64 lowers the article layer 10 onto the pallet segment 66 (FIG. 22A) and then the loading station 64 is lifted upward again (FIG. 22B, FIG. 22C). Such a transfer of the article layer 10 can be effected by means of, for instance, a shutter-type gripper head or a panel gripper head, which can discharge a complete article layer 10 downwardly by opening the gripper or by sliding its base plate to the side.

The further pusher bar 70, which is allocated to the transfer table 62, meanwhile returns to its initial position at the left side by moving along the second trajectory path 72 and above the level of article layer 10 in order to prevent collisions with one of the said article layers 10. The second support bar 74 of the loading station 64 is also returned in horizontal direction the left side (FIG. 22C) in order to stabilize a further article layer 10, while the third pusher bar 76 is moved vertically upward (FIG. 22D) so that an article layer 10 can pass underneath as it is being conveyed.

In this context it should be mentioned that other paths of motion and combinations of the transfer movements shown in the FIGS. 18 to 22 with the same or with similar, interacting modules 12, 14, and 30 are possible without departing from the basic principle of transferring complete article layers 10. It is moreover important to note that the path of motion of the transfer table 62 from a grouping system 60 at a higher level down to the loading station 64 at a lower level, as shown in the Figures, is to be considered as an example and is by no means restrictive. It is possible, for instance, that several article layers 10 are stacked on top of each other on the stacking station of the pallet segment 65 after several transfer processes, making it necessary, after receiving a further article layer 10 from the grouping system 60, to transfer said further article layer 10 to the loading station 64 by lifting the transfer table 62. In this case, which is not illustrated here, the transfer table 62 would not be lowered to the level of the loading station 64 together with the article layer 10 located on it as is shown in FIG. 19B, FIG. 19C, and FIG. 19D, but it would rather be lifted, if necessary, to the level of the uppermost article layer 10 stacked onto the loading station 64.

According to a further variant that is not shown here, the stacking method can optionally provide the possibility of depositing several article layers 10 at once on the loading station 64. By simultaneously handling and stacking several article layers 10, pallet changing times can be considerably reduced. The loading station 64 in this way serves as a sort of intermediate storage, making it possible to minimize the time required for pallet changing.

As mentioned above, a further variant which is not shown here may comprise only the grouping system 60 and the loading station 64, wherein the grouping system 60 must then be designed to be height adjustable to the different heights of the article layers 10 that are stacked onto the loading station 64.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

10 Article layer, article group
12 First module
14 Second module
16 Articles, bundles, containers
17 Lateral guide
18 Pusher bar
20 Feed motion
22 Pushing motion (pusher bar)
24 Support surface
26 Support bar
27 Pusher bar
28 Pushing motion (support bar)
30 Third module
32 Grouping table 34 Hoist
36 Stacking station
38 Feed direction
40 Support bar
42 Further pusher bar
44 Traction mechanism drive
46 Shutter-type gripper head
48 Movable elements
50 Shift path (pusher bar)
52 Shift path (second module)
60 Grouping system
62 Transfer table
64 Loading station
65 Pallet segment
66 First support bar
68 First trajectory path
70 Further pusher bar
72 Second trajectory path
74 Second support bar
76 Third pusher bar

What is claimed is:

1. A method for horizontally shifting an article group composed of a plurality of articles, comprising:
transferring the article group from a first position to a second position, the article group being conveyed horizontally in the first position on a first support surface of a first device, the article group being at a standstill in the second position on a second support surface distinct from the first support surface of a second device, the transferring occurring by pushing the article group from the first position with a first pusher bar extending horizontally above the first support surface located at a back of the article group with respect to a conveying direction, the first pusher bar decelerating as the article group reaches the standstill;
moving a support bar extending horizontally above the second support surface in front of the article group during the transferring while the first pusher bar, from above the first support surface, pushes the article group, the support bar abutting or being a slight distance ahead of the front of the article group during the decelerating so as to prevent toppling of the plurality of articles of the article group.

2. The method as recited in claim 1 wherein the first pusher bar and the support bar perform, at least temporarily, synchronous movements.

3. The method as recited in claim 1 further comprising moving the second device up or down after the article group has reached a standstill on the second device.

4. The method as recited in claim 3 wherein the second device includes at least one of a grouping table, a hoist, and a stacking station.

5. The method as recited in claim 1 further comprising stacking the article group on top of another article group after the standstill.

6. The method as recited in claim 1 wherein a pattern of the article group is maintained during the transferring.

7. The method as recited in claim 1 wherein the first pusher bar includes a plurality of pusher bars or a further support bar is provided.

8. The method as recited in claim 1 wherein the support bar contacts the front of the article group during the decelerating.

9. The method as recited in claim 8 wherein the support bar accelerates away from the front of the article group prior to the standstill being reached.

10. The method as recited in claim 1 wherein the support bar accelerates away from the front of the article group prior to the standstill being reached.

11. The method as recited in claim 8 wherein the support bar remains in contact with the front of the article group as the standstill is reached.

12. The method as recited in the claim 1 wherein the second support surface has ridges, ribs, or grooves.

13. An apparatus for horizontally shifting an article group composed of a plurality of articles, the apparatus comprising:
a first support surface of a first device,
a second support surface of a second device, the second support surface being distinct from the first support surface and having a standstill position;
at least one pusher bar extending horizontally above the first support surface and configured for engaging with a rear of the group of articles for horizontally shifting the article group from a first position to the standstill position, the first support surface being configured for horizontally conveying the article group in the first position on the first support surface, the article group being away from the second support surface in the first position, the article group being on the second support surface in the standstill position, the pusher bar configured for decelerating during the horizontal shifting; and
at least one support bar engaging with the articles at a front of the article group during the decelerating, the at least one support bar and at least one pusher bar being configured such that the at least one support bar extends horizontally above the second support surface and moves in front of the article group during the horizontally shifting while the first pusher, from above the first support surface, pushes the article group.

14. The apparatus as recited in claim 13 wherein the second support surface is on a hoist or a gripper head.

15. The apparatus as recited in claim 13 wherein the pusher bar or the support bar is coupled with a drive of an endlessly circulating traction mechanism for generating pushing motions.

* * * * *